United States Patent [19]
Kaufman et al.

[11] Patent Number: 5,544,283
[45] Date of Patent: Aug. 6, 1996

[54] METHOD AND APPARATUS FOR REAL-TIME VOLUME RENDERING FROM AN ARBITRARY VIEWING DIRECTION

[75] Inventors: Arie E. Kaufman, Plainview, N.Y.; Roni Yagel, Bexley, Ohio; Daniel Cohen-or, Tel Aviv, Israel

[73] Assignee: The Research Foundation of State University of New York, Albany, N.Y.

[21] Appl. No.: 97,637

[22] Filed: Jul. 26, 1993

[51] Int. Cl.⁶ ............................................ G06T 17/50
[52] U.S. Cl. .................................. 395/124; 395/127
[58] Field of Search .............................. 395/124, 127; 345/31, 33

[56] References Cited

U.S. PATENT DOCUMENTS

| | | | |
|---|---|---|---|
| 4,674,046 | 6/1987 | Ozeki et al. | 395/124 |
| 4,879,668 | 11/1989 | Cline et al. | 395/124 |
| 4,882,683 | 11/1989 | Rupp et al. | 395/119 |
| 4,985,856 | 1/1991 | Kaufman et al. | 395/124 |
| 5,101,475 | 3/1992 | Kaufman et al. | 395/124 |
| 5,361,385 | 11/1994 | Bakalash | 395/124 |

OTHER PUBLICATIONS

"The Multiple–Write Bus Technique" by Renate Gemballa and Rolf Lindner in *I.E.E.E. Computer Graphics and Applications*, at pp. 33–41 (Sep. 1982).

"A Generalized Object Display Processor Architecture", by S. M. Goldwasser in *I.E.E.E. Computer Graphics and Applications*, vol. 4, No. 10, at pp. 43–55 (1984).

"The Graphics PARCUM (Processing Architecture Based on Cubic Memory) System: A 3–D Memory Based Computer Architecture for Processing and Display of Solid Models" by D. Jackel, published in *Computer Graphics Forum*, North Holland, vol. 4, No. 4, at pp. 21–32 (1985).

"A Three–Dimensional Shaded Display Method for Voxel–Based Representations" by T. Ohashi, et al., *Proc. Eurographics '85*, pp. 221–232 (Sep. '85).

"Memory Organization for a Cubic Frame Buffer," by Arie Kaufman, in *Proc. Eurographics '86*, Lisbon, Portugal, pp. 93–100 (Aug. '86).

"Towards a 3-D Graphics Workstation," by Arie Kaufman, in *Advances in Graphics Hardware I*, W. Strasser (Ed.), Springer-Verlag, pp. 17–26 (1987).

"Voxel–Based Architectures for Three–Dimensional Graphics," by Arie Kaufman, in *Proc. IFIP '86, 10th World Computer Congress*, Dublin, Ireland, pp. 361–366 (Sep. '86).

(List continued on next page.)

*Primary Examiner*—Heather R. Herndon
*Assistant Examiner*—Cliff N. Vo
*Attorney, Agent, or Firm*—Hoffmann & Baron

[57] ABSTRACT

The method and apparatus of the present invention provides real-time reorientation of stored data and real-time visualization for high resolution volumetric datasets from an arbitrary designed viewing direction. The apparatus includes a modularized memory having a plurality of memory modules wherein each memory module includes a plurality of memory storage units capable of storing voxel data therein. The apparatus also includes reorientation unit coupled to each of the plurality of memory modules for simultaneously receiving voxel data from memory storage units of each memory module. The reorientation unit simultaneously provides the voxel data corresponding to a first memory storage unit to a second memory storage unit according to a desired viewing direction. The apparatus further includes fetching unit coupled to each of the plurality of memory modules for simultaneously retrieving voxel data from the plurality of memory modules according to the desired viewing direction and projection unit coupled to the fetching unit. The fetching unit provides the projection unit with voxel data retrieved from the plurality of memory modules. The voxel data retrieved by each projection ray includes a plurality of voxel attributes indicative of the characteristics of the object. The projection unit generates a projection value corresponding to the cumulation of voxel attributes. The projection value is indicative of the opaqueness of the aggregate of voxel attributes for each projection ray. The apparatus includes display unit coupled to the projection unit for displaying the projection value.

19 Claims, 24 Drawing Sheets

OTHER PUBLICATIONS

"3-D Transformations of Images In Scanline Order," by Ed Catmull et al., in *Computer Graphics*, vol. 14, No. 3, at pp. 279–285 (1980).

"Three-Pass Affine Transforms for Volume Rendering," by Pat Hanrahan in *Computer Graphics*, vol. 24, No. 5, at pp. 71–77 (Nov. 1990).

"The Image Prism: A Device for Rotating and Mirroring Bitmap Images," by Cary Kornfeld in *I.E.E.E. Computer Graphics and Applications*, at pp. 21–30 (May 1987).

"Data Parallel Volume Rendering as Line Drawing," by Peter Schröder et al., *Volume Visualization Workshop*, at pp. 25–31 (Oct. 1992).

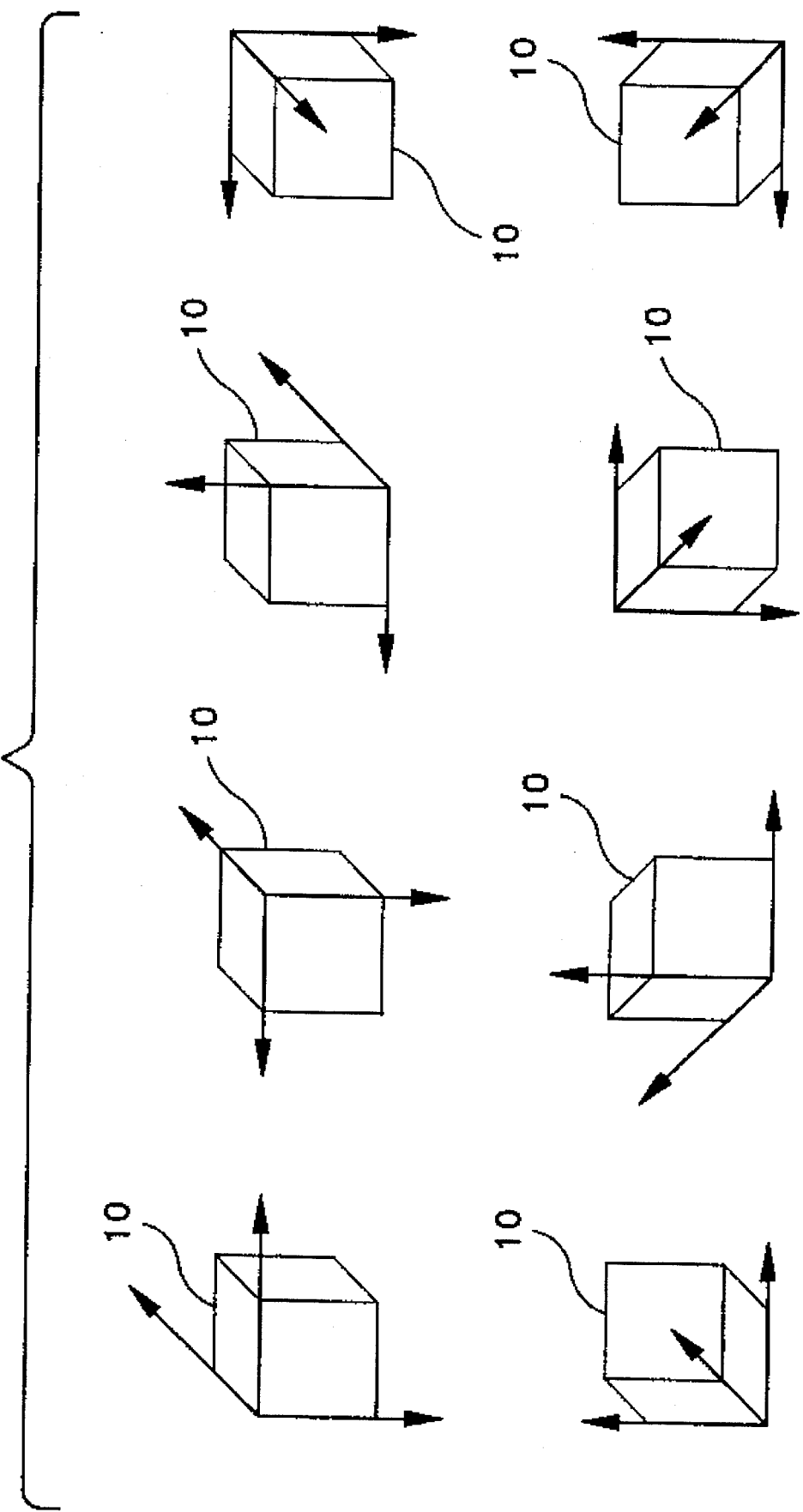

FIG-7
```
for u := 0 to M do
    for v := 0 to M do
        column_write ( u, v, v );
    for v := 0 to M do
        row_read ( u, v, v );
end_for;
```
FIG-8A
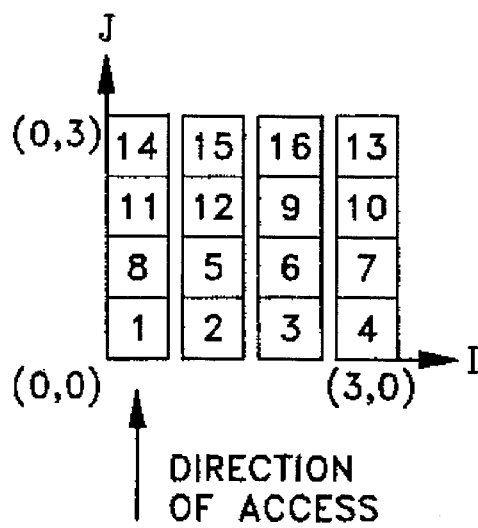
DIRECTION OF ACCESS
FIG-8B
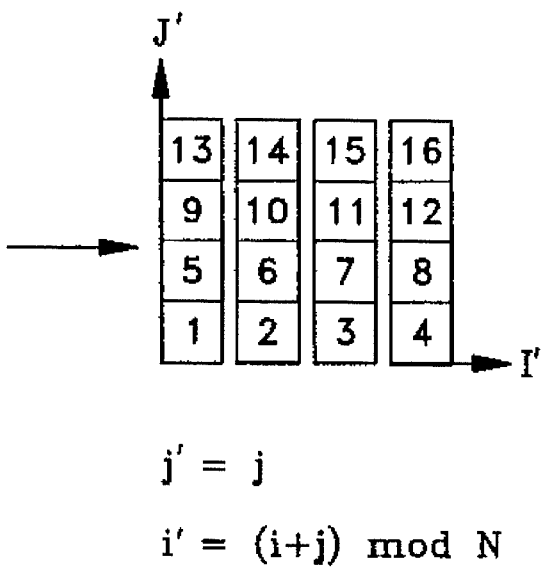
$j' = j$
$i' = (i+j) \bmod N$

FIG-10E

| 4 | 15 | 10 | 5 |
|---|----|----|---|
| 8 | 3  | 14 | 9 |
| 12| 7  | 2  | 13|
| 16| 11 | 6  | 1 |

FIG-10D

| 15 | 10 | 5  | 4  |    |    |    |
|----|----|----|----|----|----|----|
|    | 14 | 9  | 8  | 3  |    |    |
|    |    | 13 | 12 | 7  | 2  |    |
|    |    |    | 16 | 11 | 6  | 1  |

FIG-11A for $v = 0$ to $M$ do
    for $u = 0$ to $M$ do
        shift the $W$-beam at $(u,v)$ $v$ steps to the left for $w = 0$ to $M$ do
    for $u = 0$ to $M$ do
        shift the $V$-beam at $(u,w)$ $w$ steps upward for $v = 0$ to $M$ do
    for $u = 0$ to $M$ do
        shift the $W$-beam at $(u,v)$ $M-v$ steps to the right

FIG-11B for $v = 0$ to $M$ do
    for $u = 0$ to $M$ do
        shift the $W$-beam at $(u,v)$ $v$ steps to the left for $w = 0$ to $M$ do
    set vertical-offset-register of $W^w$ to $-w$ for $v = 0$ to $M$ do
    for $u = 0$ to $M$ do
        shift the $W$-beam at $(u,v)$ $-v$ steps to the right

FIG-14A $X_{max} := Y_{max}[*] := -\infty;$
$X_{min} := Y_{min}[*] := \infty;$ find the three visible faces
foreach edge $(x_0,y_0,z_0)(x_1,y_1,z_1)$ in these faces do $(\bar{x}_0,\bar{y}_0,\bar{z}_0) = (x_0,y_0,z_0) *$ TranfMatrix;
$(\bar{x}_1,\bar{y}_1,\bar{z}_1) = (x_1,y_1,z_1) *$ TranfMatrix;
$X_{min} := min(X_{min},\bar{x}_0);$
$X_{min} := min(X_{min},\bar{x}_1);$
$X_{max} := max(X_{max},\bar{x}_0);$
$X_{max} := max(X_{max},\bar{x}_1);$ foreach pixel $(x,y)$ along the line from $(\bar{x}_0,\bar{y}_0)$ to $(\bar{x}_1,\bar{y}_1)$ do $Y_{min}[x] := min(Y_{min},[x],y);$
$Y_{max}[x] := max(Y_{max},[x],y);$

FIG-14B

```
set all pixels to BACKGROUND_VOXEL
for i := X_min to X_max
    for j := Y_min[i] to Y_max[i]
        [u,v,w] := ray_enter_volume (i,j);
        [x,y,z] := ray_exit_volume (i,j);
        len := dist ([u,v,w],[x,y,z]);
        t_index := ray_tmplt_placement (i,j);
        voxel := EMPTY_VOXEL;
        while (len-- and not opaque (voxel)) do
            if (not transparent(Volume [u,v,w])) then
                voxel := compose_two_voxels (Volume [u,v,w], voxel);
            u + = Ray_tmplt[t_index].u;
            v + = Ray_tmplt[t_index].v;
            w + = Ray_tmplt[t_index].w;
            t_index++;
        end_while;
        if (not opaque(voxel))
            voxel := compose_two_voxels(BACKGROUND_VOXEL, voxel);
        draw_pixel (i,j,voxel);
end_for;
```

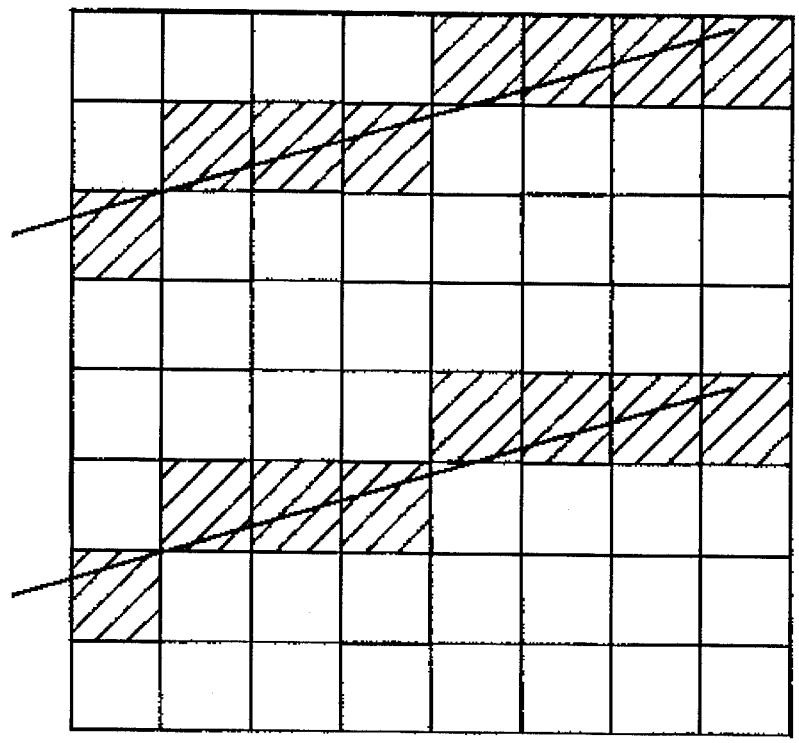
FIG-15B (3/4, 3/4)
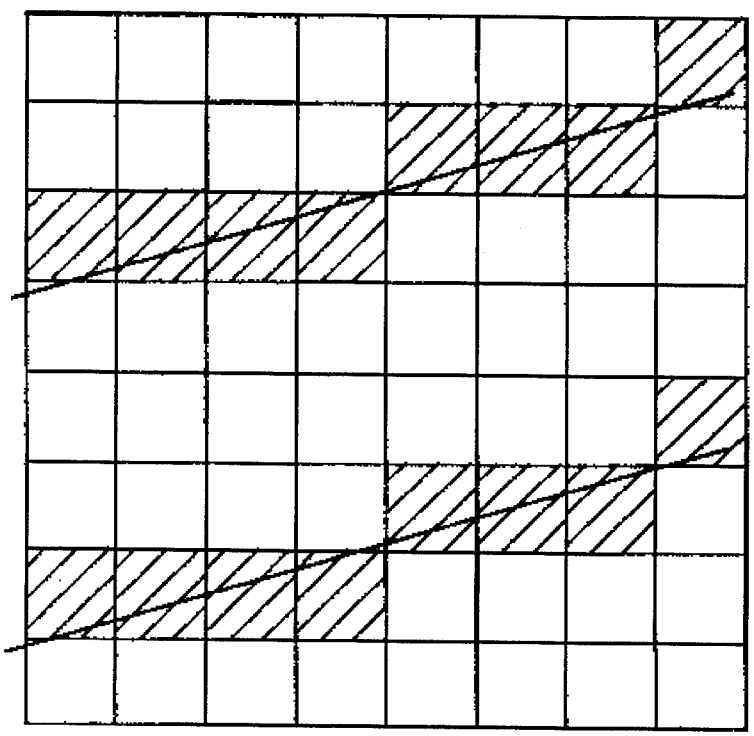
FIG-15A (1/4, 1/4)

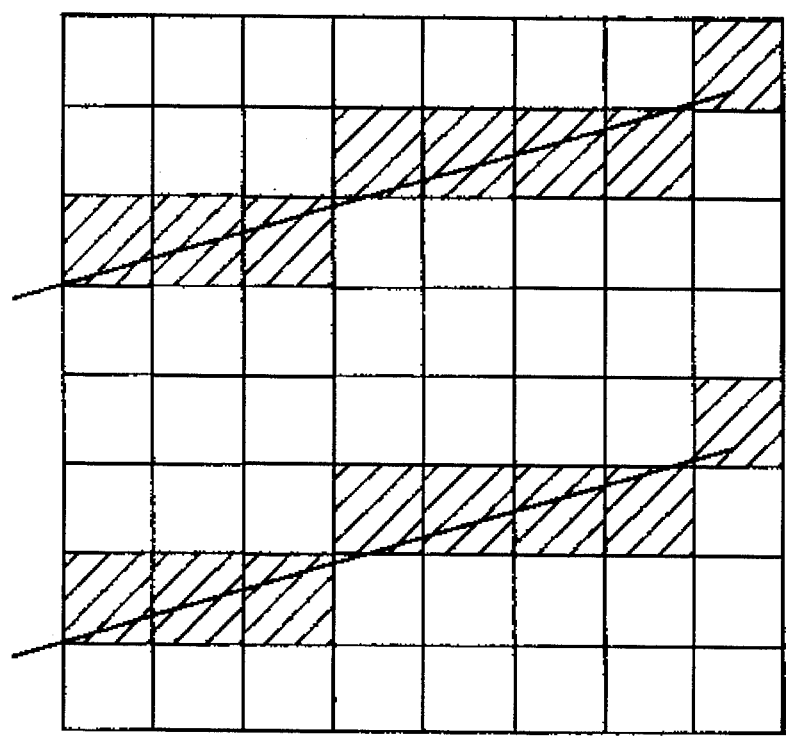
FIG-15C (1/4, 3/4)
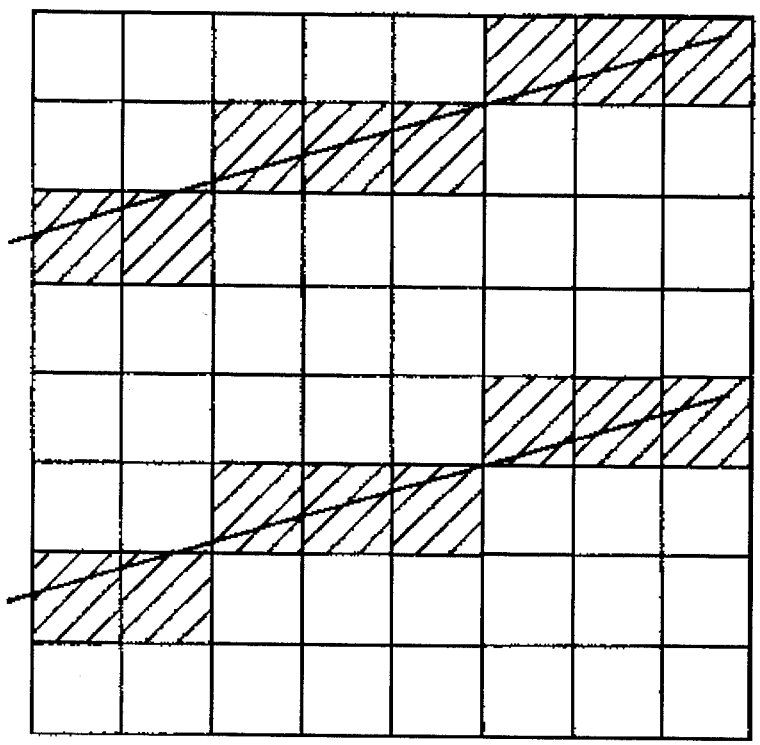
FIG-15D (3/4, 1/4)

FIG-17

```
for j := 1 to 8  do
      color := Volume[n_j];
      weight := weightab[i][j];
      sum ÷= colortab[color][weight];
end_for;
return sum;
```

FIG-18A

```
get u', v', w_0, w_N if (w_0 ≤ w_k ≤ w_N) then
      ū := u' + displace_u
      v̄ := u' + displace_v
      place voxel (u,v) on the projection mechanism
end_if;
```

METHOD AND APPARATUS FOR REAL-TIME VOLUME RENDERING FROM AN ARBITRARY VIEWING DIRECTION

BACKGROUND OF THE INVENTION

The present invention relates to three dimensional graphics and volumetric imaging and more particularly to method and apparatus for real-time rendering of high resolution volumetric images.

Image rendering is the process of converting complex information to a format which is amenable to human understanding while maintaining the integrity and accuracy of the information. Volumetric data, which consists of information relating to three-dimensional phenomena, is one species of complex information which can benefit from improved image rendering techniques. The process of analyzing volumetric data to determine, from a given view point, which portions of a volume are visible is commonly referred to as volume viewing. Traditional methods of volume viewing operate by scanning through data points in a strict sequential manner in order to achieve removal of hidden lines and surfaces. The need to model objects in two-dimensional (2-D) and three-dimensional (3-D) space is manifest, and the advantages of doing so using computer graphic systems is clear.

Presently, a variety of computer graphic systems are known, and for the greater part, have been characterized in terms of the data they manipulate. For example, there are systems which manipulate data represented on the continuous object (geometric) space $R^3$, those which operate on the discrete pixel-image plane $Z^2$, and those which work on the discrete voxel-image space $Z^3$.

A great deal of energy and effort has been expended on systems using the former two approaches. An example of a system based on such techniques is a typical 2-D computer graphics raster-display system. Therein, 3-D graphics information is stored in a "graphic display list" as a structured collection of 3-D geometric primitives which represent a model of the scene or object to be displayed. A graphics/geometry processor creates the desired image on the basis of the information stored in the display list. The display list images are transformed, shaded, colored, mapped onto the display screen, scan-converted into an unstructured matrix of pixels, and stored within a 2-D frame buffer. A video processor then refreshes the display screen from the 2-D frame buffer. Each change in the scene requires the graphics processor to repeatedly perform a complete computationally-intense pixel-generation process. This repeated processing causes both computation and buffer contention problems which slow down the operation of the graphics system. This phenomenon is crucial especially in real-time systems such as animation and simulation.

As a result of recent developments and research, graphics/geometry processors are now commercially available which speed-up the above-described computationally-intense process. In conjunction with these geometry processors, or as an alternative, parallel processors which exploit the parallel nature of images and picture handling have been utilized.

As a result of advances in computational science and technology, it has become quite conventional to use three-dimensional computer graphic systems having surface and solid modelling capabilities. As with other types of graphics systems, these computer graphic systems are characterized by the fact that the 3-D object or scene is represented by a geometric model in 3-D continuous geometric space, $R^3$. Such 3-D geometric models are typically constructed from continuous 3-D geometric representations, such as 3-D straight line segments, planar polygons, polyhedra, circles, cubic polynomial curves, surfaces, and volumes, and quadratic objects such as spheres, cones, and cylinders. These 3-D geometric representations are used to model various parts of an object, and are expressed in the form of mathematical functions evaluated over particular coordinate values in continuous $R^3$ space. Typically, the 3-D geometric representations of the 3-D geometric model are stored in a graphic display list. Once modelled using continuous 3-D geometric representations, the object can be displayed along a particular viewing direction by repeatedly scan-converting the graphic display list.

The above-described 3-D geometric-based graphic systems have significant shortcomings. For example, when viewing the 3-D geometric model of the 3-D object, only the surfaces visible to an observer along a particular viewing direction should be displayed. However, to ensure this, the hidden surfaces must be detected using surface detection algorithms, and removed by a computationally intense process referred to as "hidden surface removal". These systems also require that even for the smallest display modification, for example, a change in viewing direction, the graphic display list must be manipulated and repeatedly scan-converted, which is both time consuming and computationally intense.

Another shortcoming of the 3-D geometric-based graphic system is that the projection, rendering and manipulation of a 2-D view of the 3-D geometric model is dependent on the complexity of the scene being displayed. In addition, in some applications such as medical imaging, biology, geology and 3-D image processing, the data is already in voxel-based form and no geometric information is available.

As an alternative to 3-D geometric-based systems, several 3-D voxel-image space systems have been developed. In general, these voxel-image space systems are based on the concept that a 3-D continuous object or scene is discretized, sampled, and stored in a large 3-D Cubic Frame Buffer (CFB) memory comprising unit cubic cells called volume elements or "voxels". Three-dimensional objects are digitized and a regularly spaced 3-D matrix array of values is obtained and stored in the Cubic Frame Buffer. The 3-D array of voxels in the Cubic Frame Buffer may be loaded with experimental data obtained, for example, by a 3-D scanner such as a CAT or MRI medical scanner, or by a super computer running a simulation such as a computation in fluid dynamics, or from a voxel data base. Alternatively, the digitization is performed by scan-converting a 3-D geometric model. Both experimental and synthetic samples yield a cellular tessellation of the original volume, and the resulting cellular cubic memory provides a real yet discrete model of the 3-D scene or object. Consequently, the voxel representation, which is fundamental to all 3-D voxel-based systems, is very effective for the traditional applications employing empirical 3-D voxel imagery, such as medicine (e.g. computed tomography and ultrasounding), geology, biology, and 3-D image processing (e.g. time varying 2-D images).

The advantages of using voxel representations of objects and scenes are numerous. The projection of voxel-based images along a view direction displays only the visible surfaces and implicitly ignores the hidden surfaces of the 3-D voxel-images. Therefore, separate hidden surface removal methods need not be employed. Also, for every small modification, there is no need to repeatedly scan-convert and manipulate graphic display lists as required in 3-D geometric-based graphics systems. Rather, a change can be made directly to the Cubic Frame Buffer images (i.e. objects can be directly edited by deleting, masking out, or adding voxels with minimal computational effort). Therefore, when using a voxel-based system, projection, rendering and manipulation are independent of the scene complexity, and it is normally unnecessary to employ conventional display lists, repeated scan-conversions, and computationally intense hidden surface removal or surface detection algorithms.

To date, there have been several proposals for 3-D voxel-based graphics systems, all of which have one thing in common, namely, the utilization of high performance multi-processing architectures in order to process the enormous amount of voxel-represented data in the cellular cubic memory. These prior art voxel based systems have substantial shortcomings and drawbacks in that they cannot provide real-time manipulation of data and rendering of an object from an arbitrary viewing direction.

It is therefore an object of the present invention to provide a method and apparatus which is more efficient and, provides better resolution than existing 3-D voxel based graphics systems.

Other and further objects will be made known to the artisan as a result of the present disclosure and it is intended to include all such objects which are realized as a result of the disclosed invention.

SUMMARY OF THE INVENTION

In accordance with one form of the present invention, apparatus for providing a 3-D volume projection of an object from a desired viewing direction, which defines a plurality of projection rays, includes a modularized memory having a plurality of memory modules wherein each memory module includes a plurality of memory storage units capable of storing voxel data therein. The apparatus also includes reorientation unit coupled to each of the plurality of memory modules for simultaneously receiving voxel data from memory storage units of each memory module. The reorientation unit simultaneously provides the voxel data corresponding to a first memory storage unit to a second memory storage unit according to a desired viewing direction.

The apparatus further includes fetching unit coupled to each of the plurality of memory modules wherein the fetching unit simultaneously retrieves voxel data from the plurality of memory modules according to the viewing direction. The apparatus includes projection unit coupled to the fetching unit. The fetching unit provides the projection unit with voxel data retrieved from the plurality of memory modules according to each of the plurality of projection rays. The voxel data retrieved by each projection ray includes a plurality of voxel attributes indicative of the characteristics of the object according to the desired viewing direction. The projection unit generates a projection value corresponding to the cumulation of voxel attributes for each of the plurality of projection rays wherein the projection value is indicative of the opaqueness of the aggregate of voxel attributes for each projection ray along the desired viewing direction. The apparatus includes display unit coupled to the projection unit for receiving projection values for each of the plurality of projection rays and displaying the corresponding opaqueness with the display unit.

In another embodiment of the present invention, the method for providing a 3-D volume projection image of an object from a desired viewing direction includes selecting a viewing direction and a corresponding screen plane, represented by a plurality of pixels, on which to provide a 3-D volume image projection. The method further includes determining a primary side of a modularized memory corresponding to that side of the memory that projects to the largest area on the screen plane along the desired viewing direction. A base plane is then determined which is parallel to the primary side of the cubic memory.

The method further includes projecting an outline of the characteristics of the object along the desired viewing direction on the base plane so as to determine an object image extent corresponding to the outline of the voxel attribute data on the base plane. Thereafter, a ray template, defined by ray stepping increments, is determined in accordance with the desired viewing direction. The plurality of ray stepping increments defines the traversal of each of the plurality of projection rays through the memory. Then, the plurality of projection rays are traversed through the memory from each pixel of the display screen within the boundaries of the base plane object image extent according to the ray stepping increments. The traversal of each of the plurality of projection rays accesses and combines a plurality of voxel attribute data stored in the plurality of memory storage units to provide a pixel display value. Thereafter, each pixel display value is mapped from the base plane onto the screen plane for display by the pixels.

The present invention surpasses existing 3-D voxel based graphics methods and architectures in terms of performance, simplicity, image quality, extendability and ease of hardware realization so as to provide real-time high resolution volume viewing from an arbitrary direction.

A preferred form of the apparatus and method for real-time volume rendering from an arbitrary direction, as well as other embodiments, objects, features and advantages of this invention, will be apparent from the following detailed description of illustrative embodiments thereof, which is to be read in connection with the accompanying drawings.

BRIEF DESCRIPTION OF THE DRAWINGS

FIG. 4A is a representation of the set of possible positions for the origin of a data coordinate system;

FIG. 7 is a computer implementation of the method for rotating voxel data about one axis of a modularized memory coordinate system;

FIGS. 8(a) and 8(b) are a 2-D representation of the modularized memory showing a flip buffer which allows, according to the present invention, parallel access to both rows and columns by means of a skewed memory organization;

FIG. 10D is the 4×4 memory module of FIG. 10C after a second step of shearing;

FIG. 10E is the shifted memory module of FIG. 10D wherein the memory storage units are wrapped around to be in 4×4 form;

FIG. 10F is the 4×4 memory module of FIG. 10E after a third step of shearing;

FIG. 10G is the shifted memory module of FIG. 10F wherein the memory storage units are wrapped around to be in 4×4 form.

FIG. 11A is a first computer implementation of 3-D shearing which provides a rotation of voxel data about one axis of a modularized memory;

FIG. 11B is a second computer implementation of 3-D shearing which provides a rotation of voxel data about one axis of a modularized memory;

FIG. 14A is a computer implementation for initialization of the method of real-time volume rendering according to the present invention;

FIG. 14B is a computer implementation of the method of real-time volume rendering according to the present invention;

FIGS. 15(a), (b) (c) and (d) are a representation of screen super-sampling for a pixel at coordinate (i,j);

FIG. 17 is a computer implementation of the method of real-time volume rendering utilizing template-based interpolation according to the present invention;

FIG. 18A is a computer implementation of the method for U and V coordinate displacement for accessing voxel data along a viewing ray according to the present invention;

DETAILED DESCRIPTION OF THE PREFERRED EMBODIMENTS

The method and apparatus of the present invention are capable of manipulating data and supporting real-time rendering of high resolution voxel-based datasets. The method and apparatus are designed for use as a voxel based system.

A voxel is the 3-D conceptual counterpart of the 2-D pixel. Each voxel is a quantum unit of volume that has numerical values associated with it representing some measurable properties or attributes of the object or phenomenon corresponding to a particular location. In the preferred embodiment of the invention, the size of each voxel is chosen so that a voxel contains information relating to only one object of the scene. The aggregate of all voxels are stored as a 3-D grid of voxels, also called the 3-D Cubic Frame Buffer, 3-D Raster or Volume Buffer.

Figure 1:
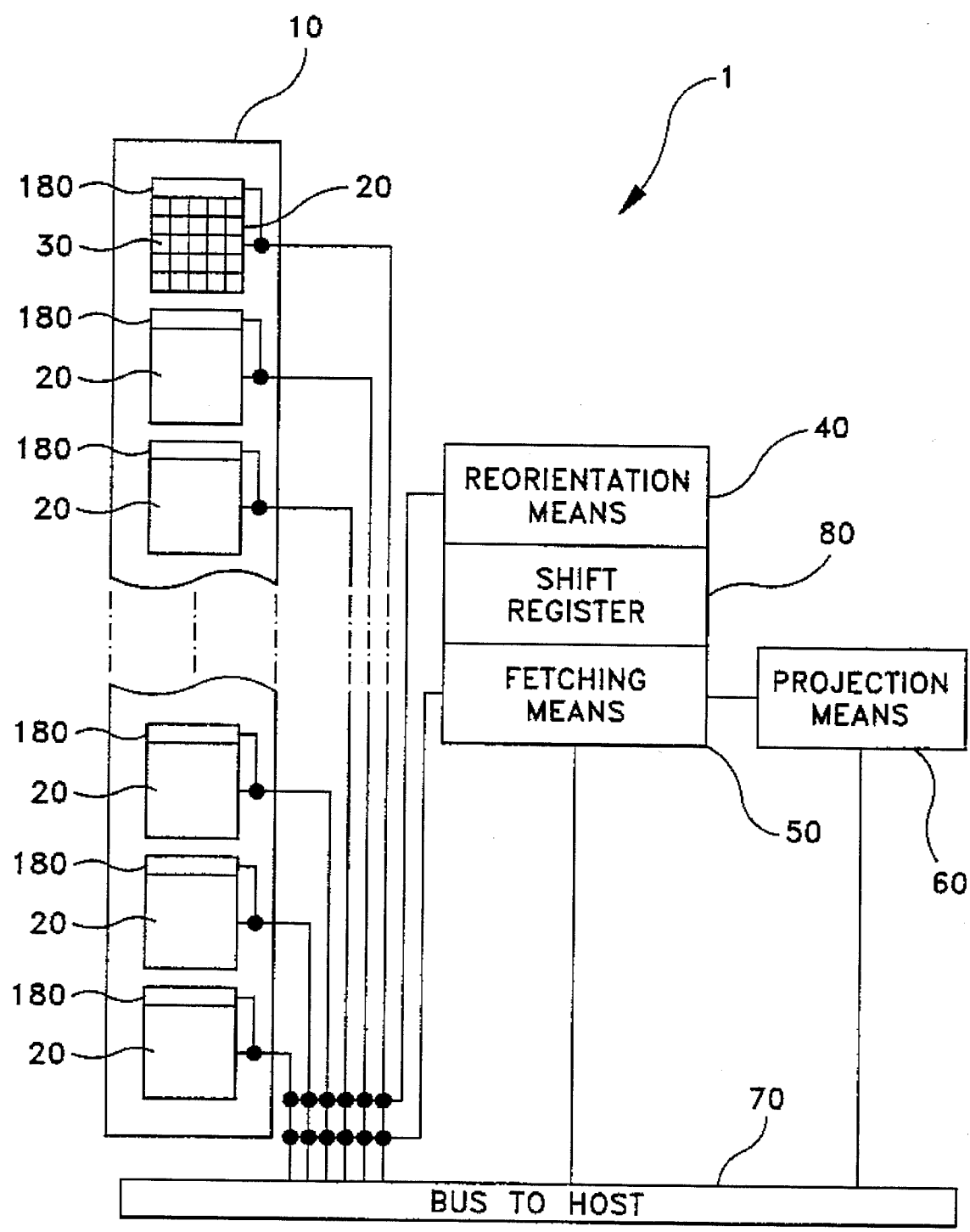
FIG. 1 is a block diagram of the apparatus for providing 3-D volume projection of an object from a desired viewing direction in accordance with the present invention.

Referring now to FIG. 1, the apparatus of the present invention hereinafter referred to as the flipping cube 1, is illustrated as including four basic components. These include a modularized memory 10 having a plurality of memory modules 20. Each memory module of the modularized memory has a plurality of memory storage units 30. The flipping cube also includes reorientation unit 40 (having a shift register 80) coupled to each of the plurality of memory modules, fetching unit 50 coupled to each of the plurality of memory modules and ray projection unit 60 coupled to each of the plurality of memory modules. As shown in FIG. 1, each of the four basic components of the flipping cube are coupled to a bus 70 which may also be coupled to a control circuit or a host computer (not shown). The modularized memory may be accessed by the host computer or control circuit via the bus which is capable of storing a modularized memory voxel address and corresponding data items. The bus also serves as a conduit for transferring commands from the host computer to the flipping cube. The flipping cube is designed to provide improved manipulation and access to all voxel data stored in memory storage units (voxels) comprising a projection ray in a relatively fast parallel manner for real-time viewing of objects stored in the modularized memory. The flipping cube also performs rapid processing of the information stored in the modularized memory by utilizing a projection mechanism in order to access all voxels comprising a projection or sight ray in parallel (i.e., simultaneously) so as to determine, in real-time, the corresponding color of the pixel from which the sight ray originated.

Figure 2A:
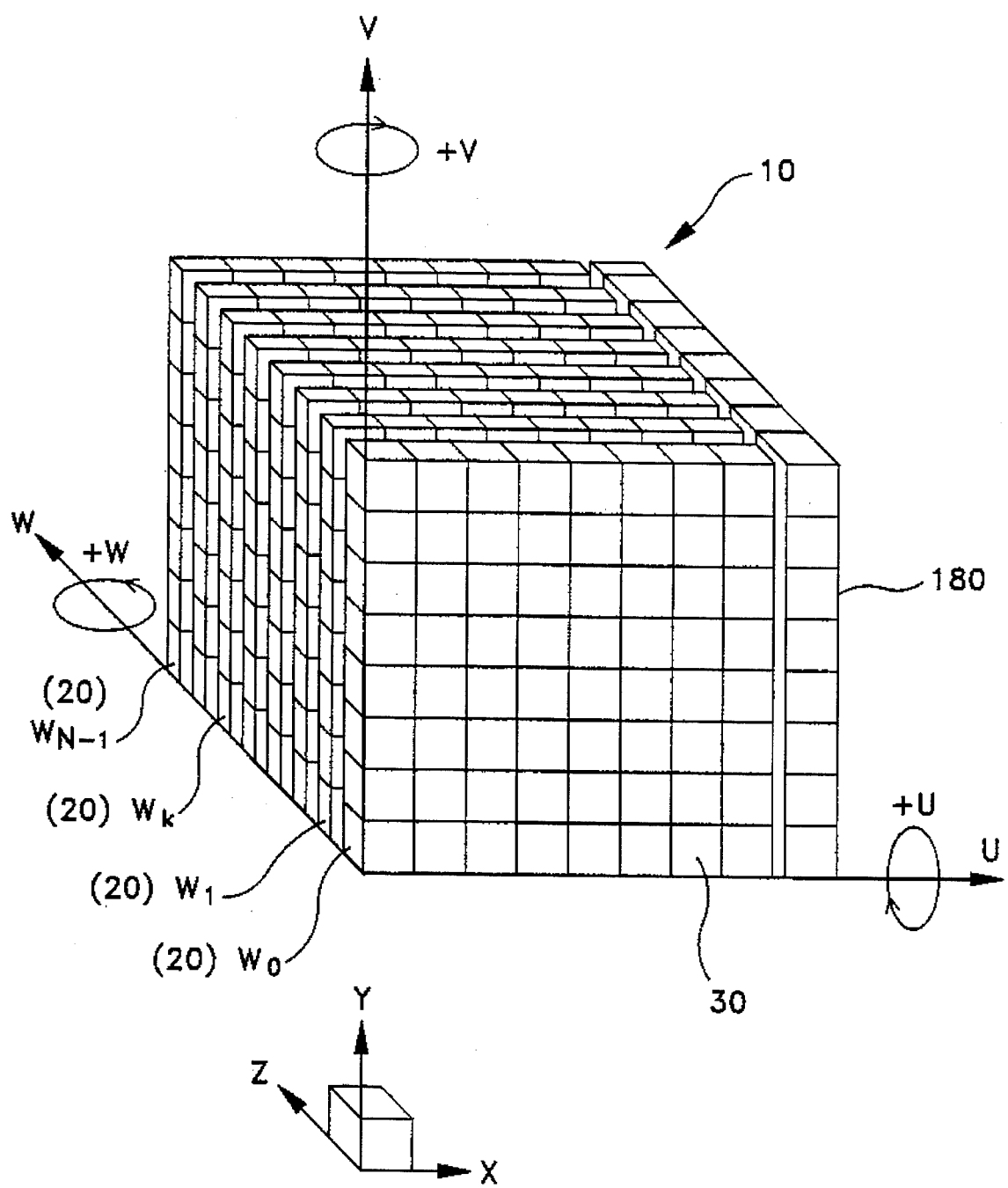
FIG. 2A is a perspective view of a representation of a modularized memory, memory modules (w slice of memory) and memory storage units along with modularized memory coordinate axes and data coordinate axes in accordance with the present invention.

Referring now to FIG. 2A, the modularized memory 10, including the plurality of memory modules 20, can be represented as a three dimensional configuration of N×N×N memory storage units 30, or volume elements (voxels). For simplicity, we will assume that $N=2^n$ for some integer n. FIG. 2A shows an 8×8×8 cubic memory where n=3.

Figure 2B:
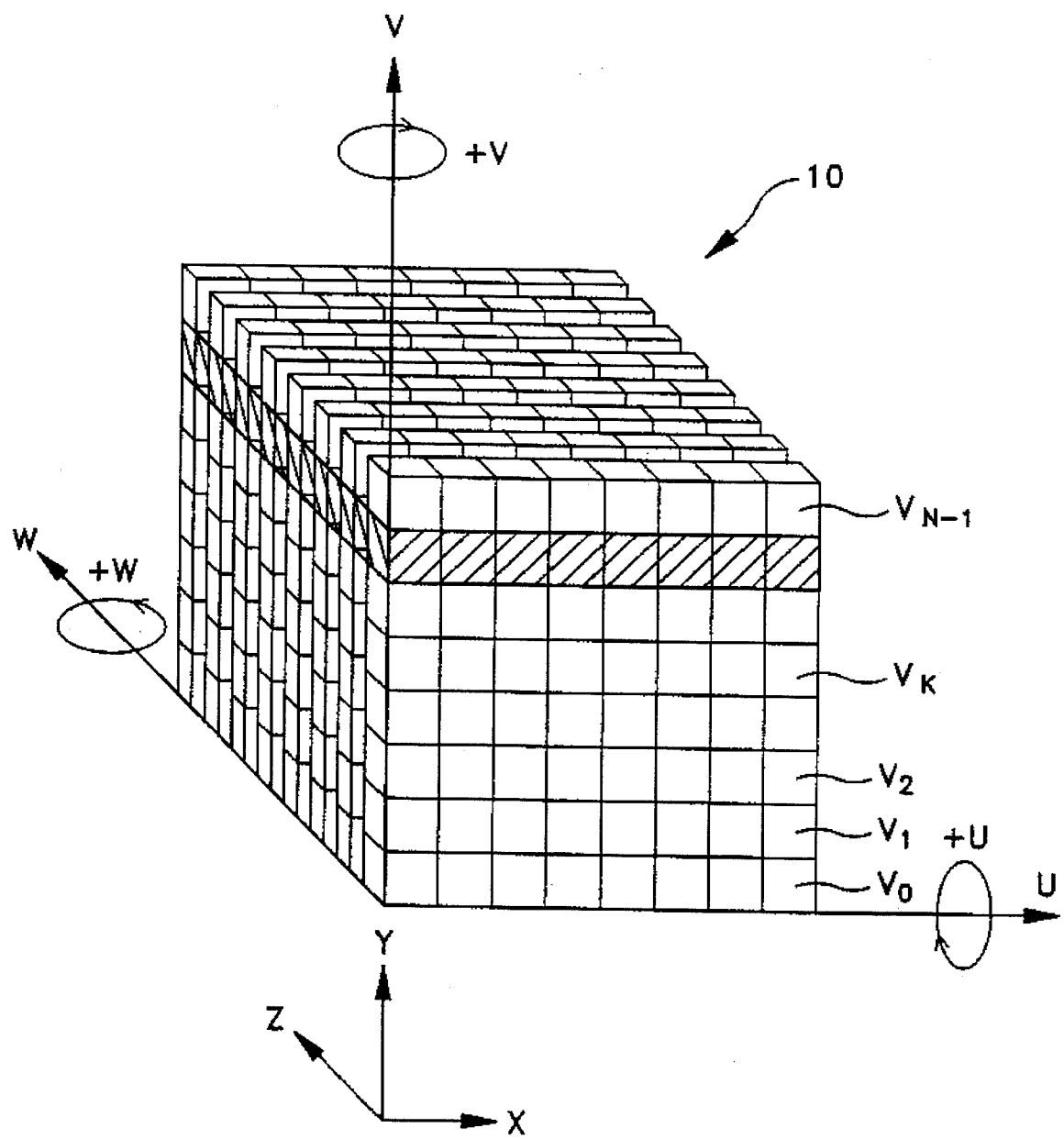
FIG. 2B is a perspective view of a representation of a modularized memory in accordance with the present invention showing a V-slice of memory.
Figure 2C:
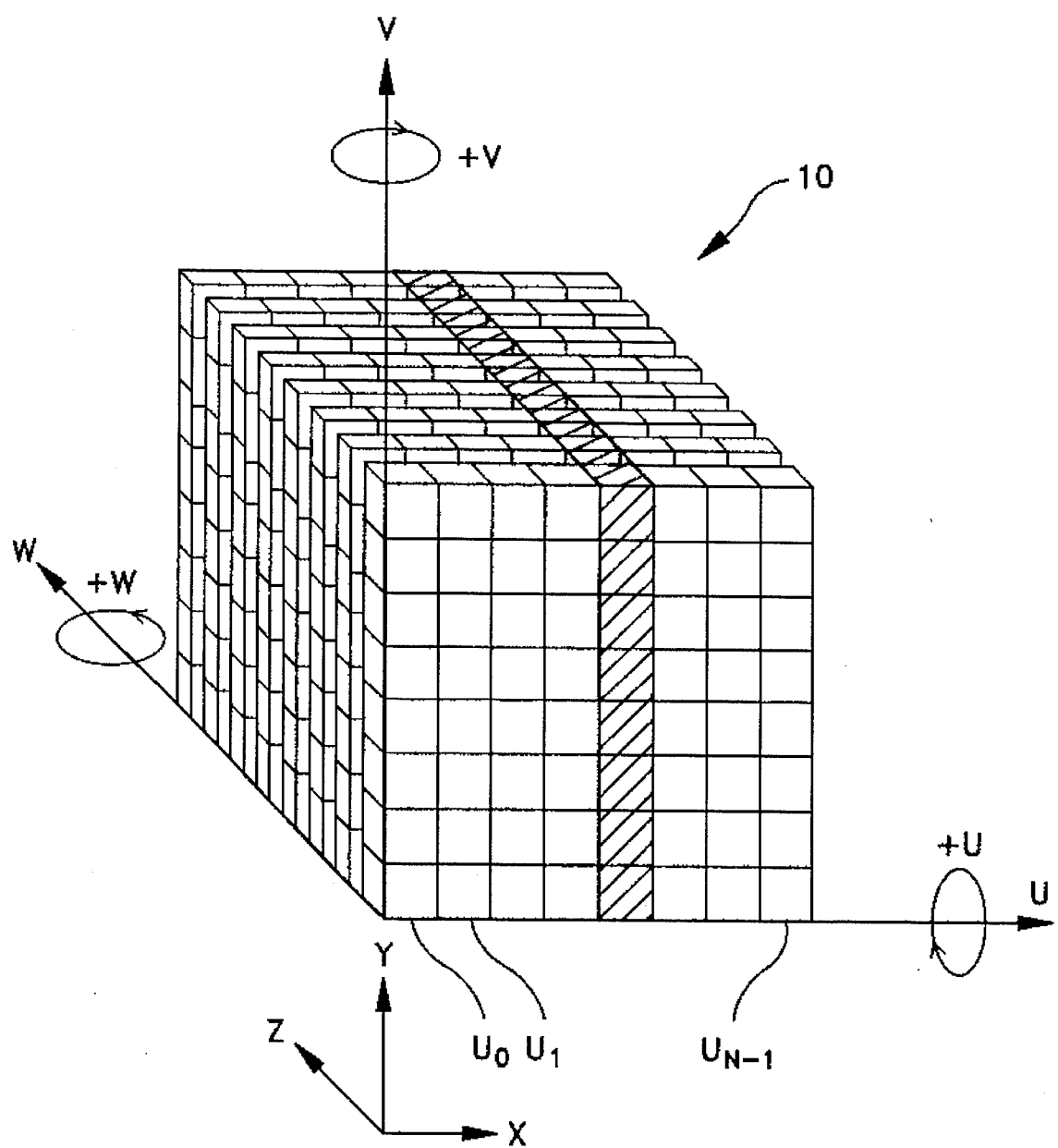
FIG. 2C is a perspective view of a representation of a modularized memory in accordance with the present invention showing a U-slice of memory.

As shown in FIG. 2A, the modularized memory 10 of the flipping cube is partitioned into N memory modules 20 or slices, each having $N^2$ memory storage units 30 which are each capable of storing one voxel data. The axes of the modularized memory are denoted U, V and W wherein memory module $W_k$ indicates the $k^{th}$ slice of memory perpendicular to the W axis. Similarly, and as shown in FIG. 2B, $V_k$ denotes the $k^{th}$ slice of memory perpendicular to the V axis and as shown in FIG. 2C, $U_k$ denotes the $k^{th}$ slice of memory perpendicular to the U axis. The addressing scheme of each memory storage unit in the modularized memory 10 is indicated by (i, j, k) representing values for the U, V and W coordinates respectively, wherein the (i, j, k) memory storage unit is located at (i, j) in memory module $W_k$.

It should be noted that the voxel data is defined by axes of a data coordinate system in a manner similar to that of the addressing of the memory storage units. The data coordinate system and its respective axes X, Y and Z, are separate and distinct from the axes and coordinates of each of the memory storage units of the modularized memory coordinate system. Specifically, and as shown beneath the cubic memory coordinate system in FIG. 2A, the axes of the data coordinate system are denoted by X, Y and Z. In the preferred embodiment of the present invention, the voxel data is provided into the modularized memory. Thereafter, the voxel data can be manipulated in such a way that each portion of voxel data maintains its relationship to neighboring voxel data, but the cumulative effect provides that the axes of the data coordinate system rotate about the center of the modularized memory coordinate system. This rotation of the voxel data coordinate system may include moving voxel data from one memory storage unit to a second memory storage unit so as to effectuate a "flip". In the alternative, the memory storage unit addresses may be redefined to effectuate a virtual flip. From the above, it follows that each portion of voxel data will have two identifying addresses, a data coordinate system identification (x, y, z) which remains constant, even though voxel data will change locations within the cubic memory, and a modularized memory system address (u, v, w) which will change as the axes of the data coordinate system are effectively rotated about the origin and axes of the modularized memory system.

According to the present invention, sight ray parallelism, accessing a beam or ray of voxel data which is stored in memory storage units of the modularized memory, is defined as only existing along one axis of the modularized memory coordinate system, the W-axis. Therefore, sight rays or projection rays that are "provided into" the cubic memory to access stored voxel data are preferably substantially parallel to the W-axis (i.e., have their major change of coordinate value along the W-axis).

Figure 3:
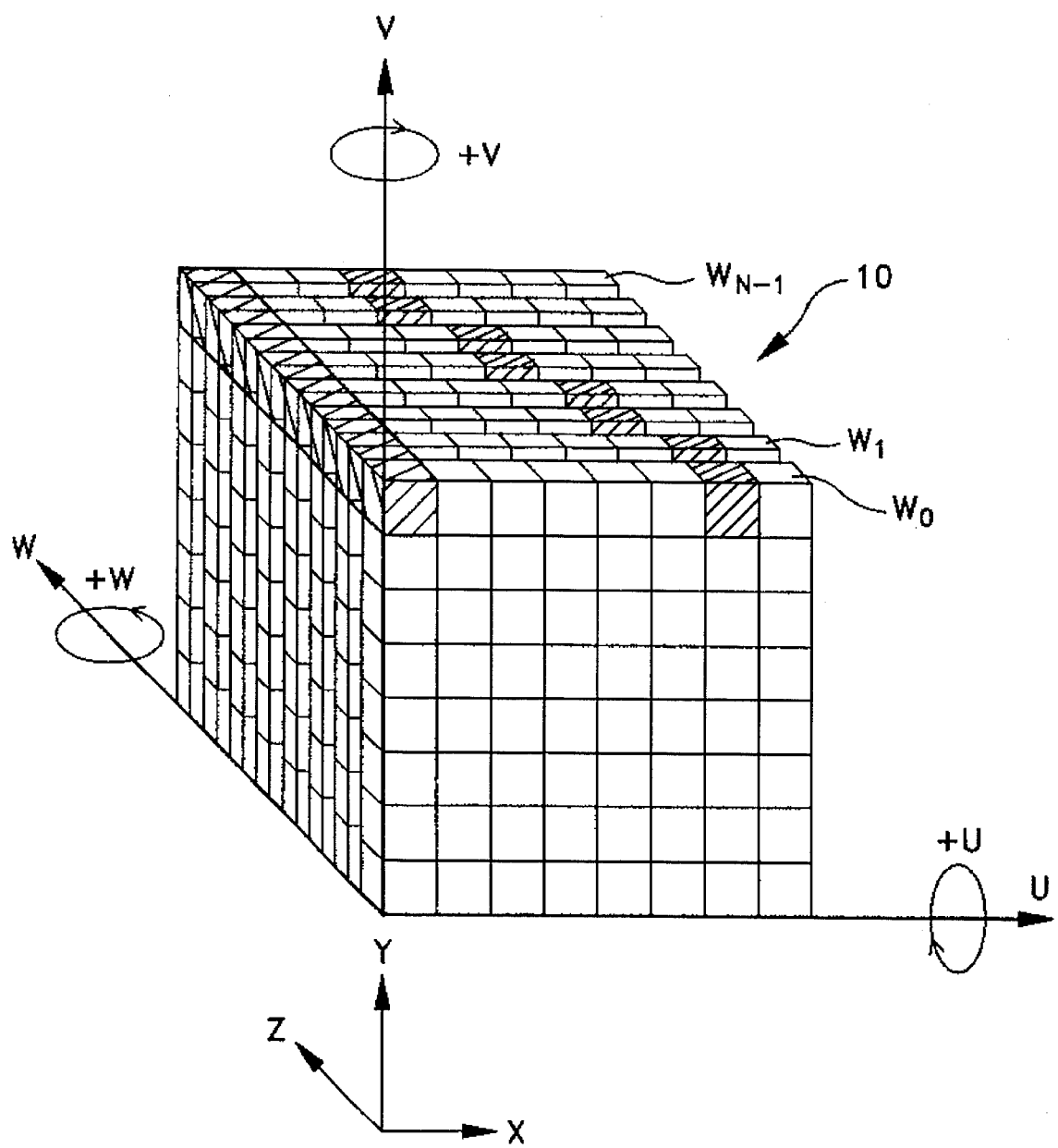
FIG. 3 is a perspective view of a representation of a modularized memory in accordance with the present invention showing the memory modules accessed by two possible rays.

In the preferred embodiment, it is desirable to utilize sight and projection rays having a 26 voxel-connectivity because the major axis or dimension of the 26-voxel-connectivity ray (the coordinates of the ray which has the greatest change or slope from a first point to a second point), will traverse only one memory storage unit in each memory module. Therefore, a 26 voxel-connected ray will access only one memory storage unit (and provide one portion of voxel data) from each memory module. This permits the voxel data to be accessed in parallel (i.e., simultaneously retrieving one voxel data from each memory module so as to provide real time access to the stored data). FIG. 3 shows the path of two 26-voxel connectivity rays traversing through the modularized memory wherein each ray encounters only one memory storage unit per memory module. In addition to changes in the U and W coordinates of the rays as shown in FIG. 3, a ray may also change its V coordinate. However, a 26-connected ray travelling in the W direction will always encounter only one memory storage unit per memory module.

Figure 4B:
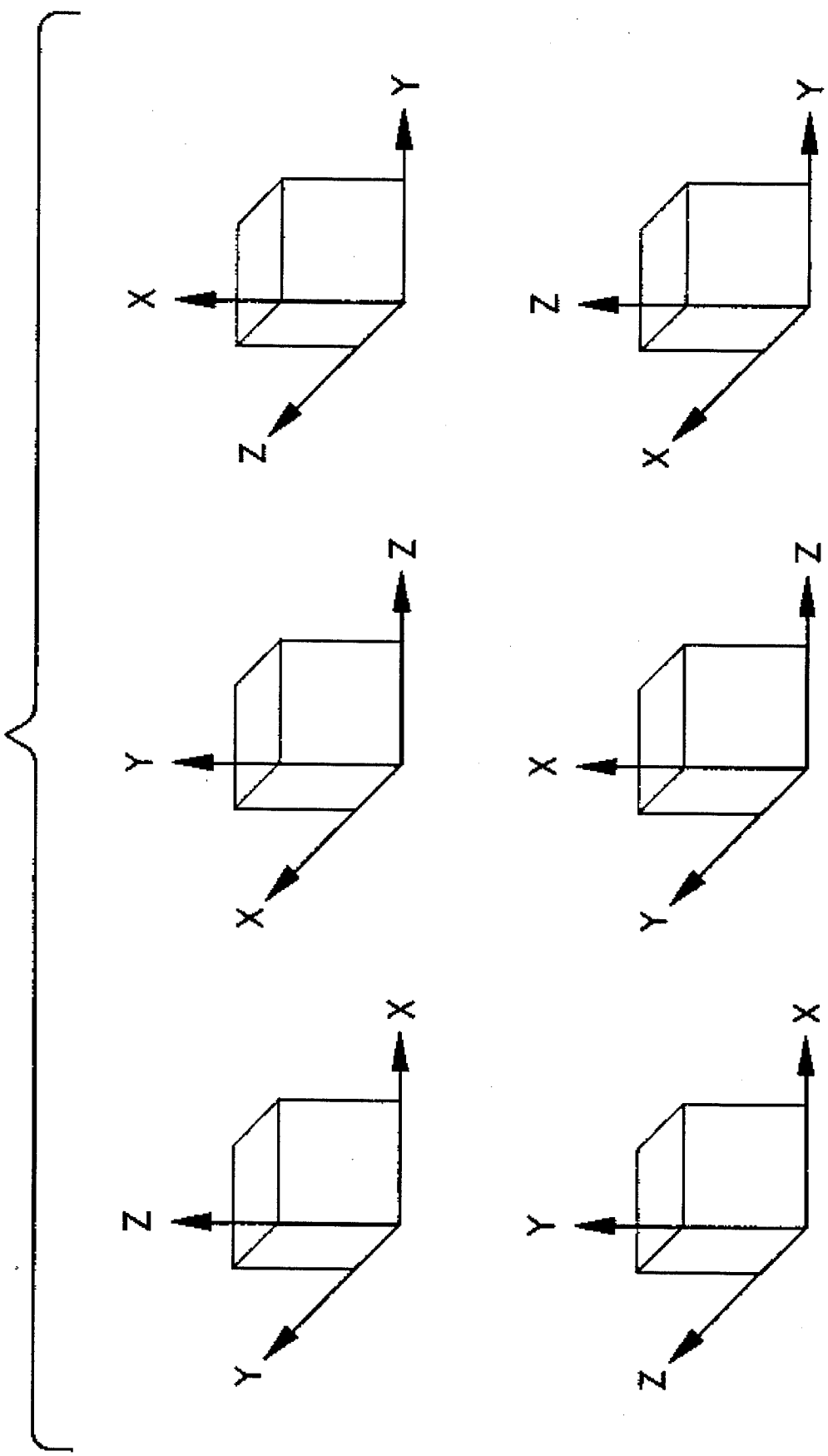
FIG. 4B is a representation of the set of possible orientations of the axes of the data coordinate system for each of thee eight origin locations shown in FIG. 4A.

Referring now to FIGS. 4A and 4B, the voxel data of the data coordinate system can be provided to the modularized memory in 48 distinct ways. Specifically, FIG. 4A illustrates that there are eight possible positions for the origin of the data coordinate system and FIG. 4B illustrates that there are six possible orientations of the axes of the data coordinate system for each of the eight origin locations. In the preferred embodiment, when voxel data is provided to the modularized memory in one of the 48 orientations of the data coordinate system shown in FIG. 4A and 4B, one axis of the data coordinate system (X, Y, Z) can be chosen to be parallel or correspond to the W axis of the cubic memory coordinate system. Therefore two axes of the data coordinate system remain to be parallel to, or correspond to, the Y and Z axes. When the data is stored in such a way that the Z axis is parallel with the W axis of the cubic memory coordinate system, the voxel data and corresponding data coordinate system are said to be in Z-parallel orientation (i.e., the Z axis is parallel to the W axis). In the preferred embodiment, the X, Y, Z origin of the data coordinate system is placed (coincides with) the U, V, W origin of the cubic memory coordinate system. It should be noted that if the voxel data and the corresponding axes of the data coordinate system (X, Y, Z) are properly reoriented or provided to the modularized memory in a different sequence, the data can alternatively be said to be in X-parallel or Y-parallel orientation where one of the X-axis or Y-axis of the data coordinate system are parallel to the W-axis of the cubic memory coordinate system. In the preferred embodiment of the present invention, parallelism is chosen to exist along the W-axis. However, the selection of the W-axis is arbitrary and parallelism could be selected to be on the U or V axis, as long as consistency is maintained.

The reorientation unit 40, which in the preferred embodiment includes a shift register 80, is utilized as a unit with which the memory modules 20 ($W_0$ through $W_{N-1}$) of the modularized memory 10 are connected for contiguous two-way transmission of information signals representing voxel data values with each other so as to reorient voxel data through rotation. The reorientation of voxel data is performed so that the selected viewing direction of the voxel data is substantially parallel with the W-axis of the cubic memory. Therefore, if the desired viewing direction of the object represented by voxel data is along the Z axis, and the voxel data was originally provided to the modularized memory such that the data coordinate system was in Z-parallel orientation (Z-axis parallel to W-axis), then no reorientation of voxel data and axes of the data coordinate system is required. However, if the desired viewing direction of the object is along the X-axis, and the voxel data was originally provided to the modularized memory in Z parallel orientation, then the voxel data and data coordinate system axes would have to be reoriented and rotated respectively, to provide an X-parallel orientation.

In the preferred embodiment, each memory module 20 of the modularized memory 10 is coupled to the reorientation unit 40, and has the capability to provide voxel data to the reorientation unit. The reorientation unit 40, which includes a plurality of registers, is capable of serially rotating a set of N voxel data (one from each memory module, $W_k$) any desired number of steps a, to a new location in the reorientation mechanism which corresponds to another memory module ($W_{k+a}$) of the modularized memory. Each memory module will read voxel data from the reorientation unit found after the rotation has taken place. Thereafter, the rotated voxel data is stored therein. This process is performed by the reorientation mechanism $N^2$ times until the information of each memory module has been transmitted to a proper new memory module location, effectively rotating the data coordinate system about the center of the cubic memory coordinate system origin.

The reorientation mechanism, as described, is designed to reorient the voxel information stored in the memory storage units of the cubic memory in accordance with the desired viewing direction so that the viewing direction of the object and voxel information is substantially parallel to the W axis of the modularized memory. In the preferred embodiment, the system permits voxel data to be accessed only along the W-axis of the modularized memory. As a result, if the data coordinate system is in a Z-parallel orientation (i.e., the Z-axis of the data coordinate system is aligned with the W-axis of the cubic memory coordinate system) and it is desired to view the representation of the object stored in the cubic memory from a direction parallel to the +X axis of the data coordinate system, a reorientation of the information stored in the modularized memory would include manipulating the voxel data so that the +X axis of the data coordinate system coincides with (i.e., is aligned with) the +W axis of the cubic memory coordinate axis.

As previously stated, the apparatus of the present invention also includes projection unit 60 coupled for contiguous two-way transmission of information signals to fetching unit 50. The projection mechanism of the flipping cube 1 performs ray projection by requesting that the fetching unit 50 access a beam of voxel information from of the modularized memory, one voxel from each memory module simultaneously, along the major W-axis. The projection mechanism, like the reorientation mechanism, accepts N voxel data, one from each memory module, from the fetching unit corresponding to a viewing ray. The projection mechanism then performs hidden voxel data removal (i.e., the mechanism ignores the voxel information that represents characteristics of the object which are not visible, or the voxel information which does not add to the characteristics of the projection ray along the desired viewing direction). A variety of known projection methods may be employed such as traditional first last opaque projection, maximum minimum projection, weighted additive projection and semitransparent composition.

Figure 5:
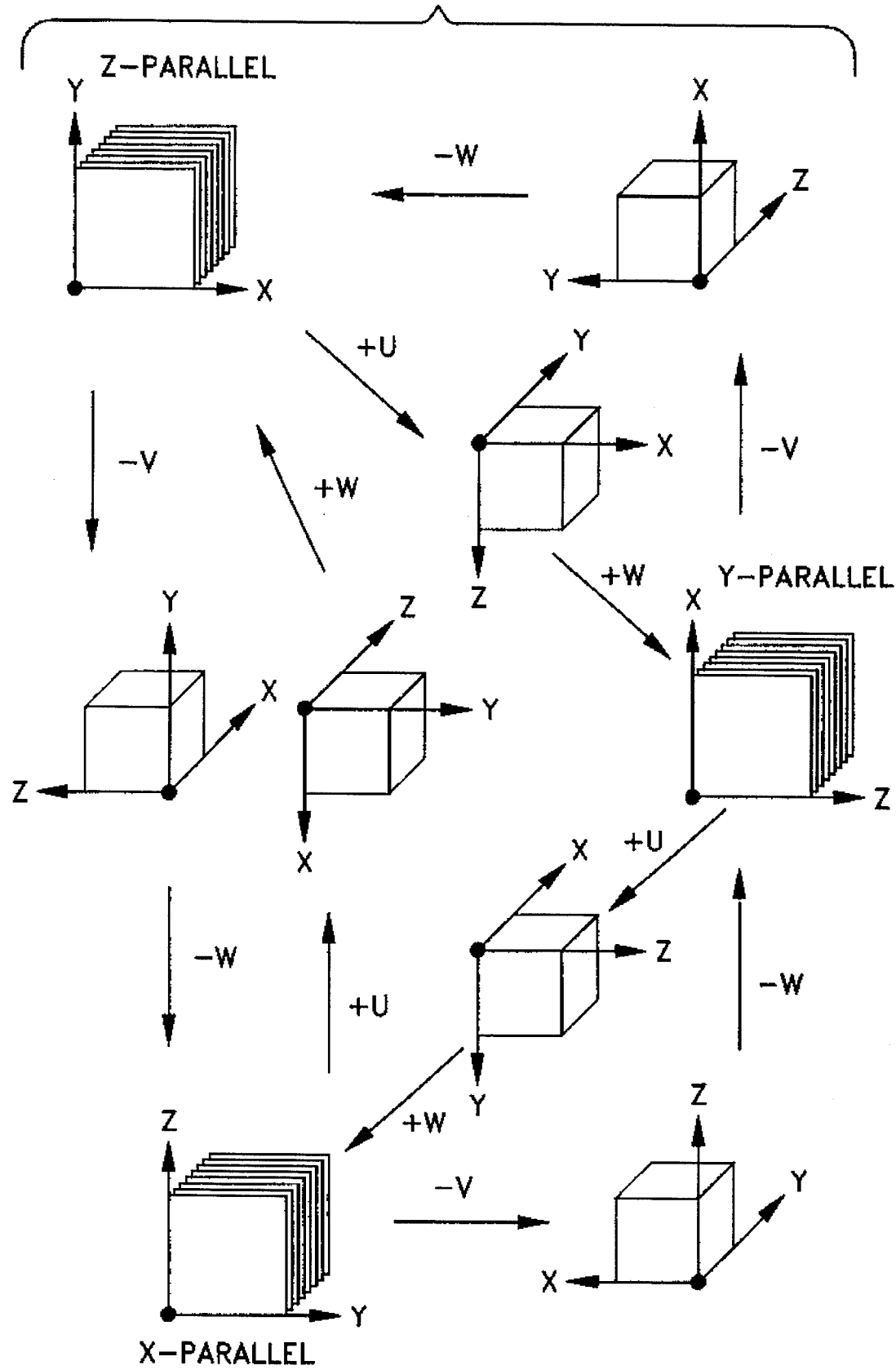
FIG. 5 a set of possible flipping operations of the voxel data required according to the present invention for converting between X parallel, Y parallel and Z parallel orientation.

Referring now to FIG. 5, the reorientation of voxel data between X-parallel, Y-parallel or Z-parallel configurations is shown. In the preferred embodiment of the present invention, the reorientation of voxel data from one orientation to another is achieved by either a +W or −W rotation of the voxel data and either a +U or −V rotation of the voxel data. As shown in FIG. 5, a reorientation from an arrangement having a Z-parallel configuration to an X-parallel arrangement requires two manipulations of the voxel data of the data coordinate system. First, a reorientation of the data around the V axis (in the negative direction) of the cubic memory coordinate system is required. Then, a rotation of the voxel data around the W-axis (in the negative direction) of the cubic memory axis yields the correct orientation (X-parallel). As previously stated, these rotations of the data coordinate system occur by either physically rotating voxel data or by re-defining the location of each voxel data point (X, Y, Z) in the modularized memory. From FIG. 5, it is evident that the data coordinate system and all data stored therein can be reoriented from a current orientation to an X, Y or Z parallel orientation with only a reorientation of voxel data about either the V or U axis, and a rotation of the data coordinate system about the W axis. FIG. 5 shows the necessary rotations of the voxel data and the corresponding location of the data coordinate system so as to convert between X-parallel orientation, Y-parallel orientation and Z-parallel orientation according to the desired viewing perspective.

Figure 6:
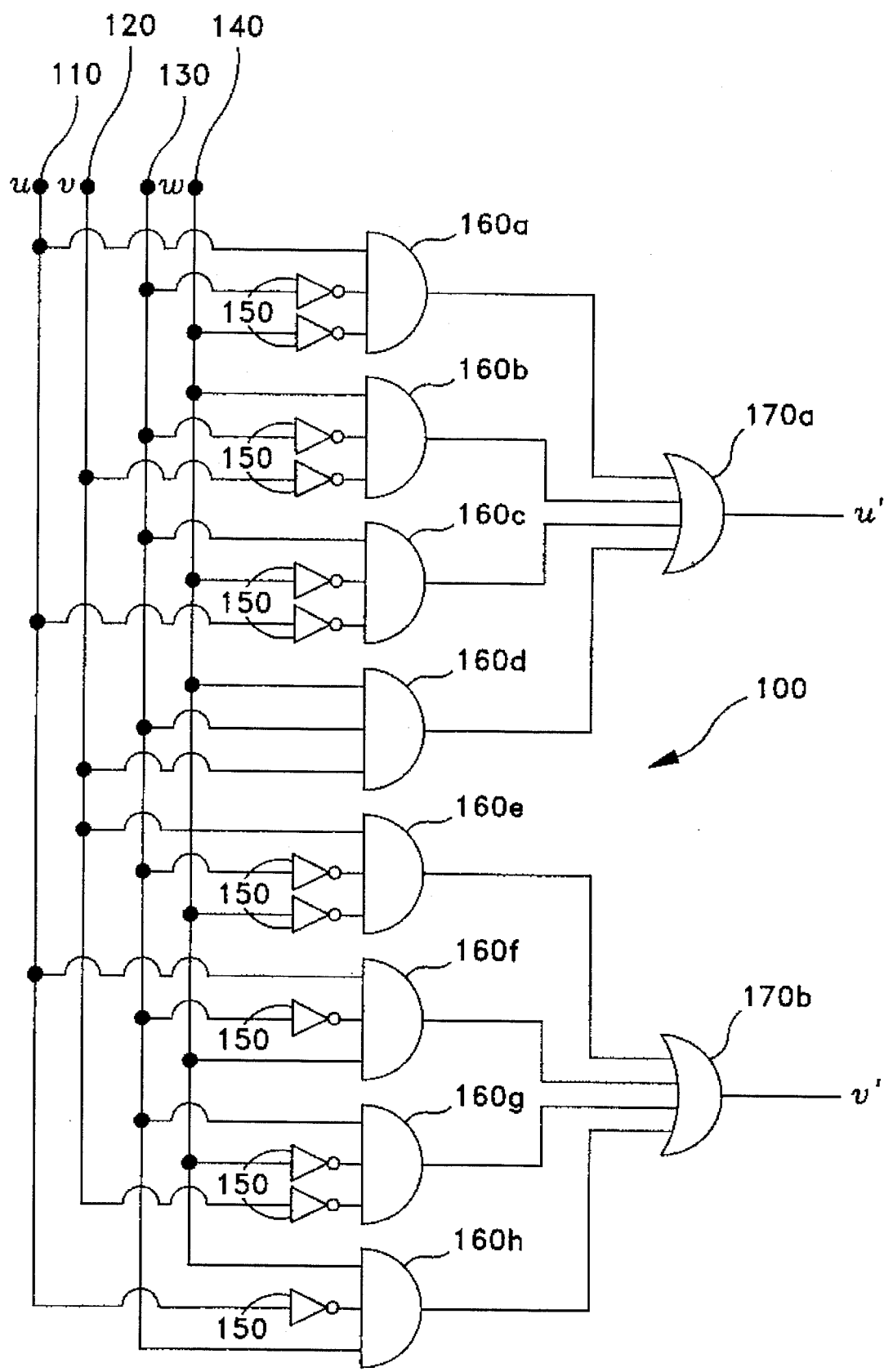
FIG. 6 is a schematic representation of a virtual flipping circuit according to the present invention for providing a virtual flip of voxel data about the axis of the modularized memory coordinate system.

In the preferred embodiment of the present invention, the actual data coordinate system and voxel data stored in the memory storage units need not be physically reoriented to achieve a +W or −W rotation. Preferably, a virtual flipping circuit 100, as shown in FIG. 6 is included and coupled to each memory module. As a result of utilizing the virtual flipping circuit 100, a physical reorientation of voxel data is not needed and only a virtual rotation of the data coordinate system and the voxel data is required. This virtual flip involves only altering the addresses of the memory storage units of each memory module. A physical reorientation of the voxel data is not required for a rotation about the W-axis because the voxel data stored in the memory storage units does not change its memory module or slice ($W_k$) for a +W or −W rotation, and therefore does not change its W coordinate value. As a result, the new address of the memory storage unit storing voxel data at (u,v) in memory module $W_k$ after either a +W or −W rotation can be denoted by coordinates (u', v') in memory module $W_k$.

Table 1 shows a mapping of new address (u', v') of the memory storage unit (u,v) after a corresponding virtual rotation about the W axis. Table 1 also indicates that two control inputs (a, b) are required to designate the four rotations about the W axis (0°, 90°, 180°, 270°).

TABLE 1

| Control Input a | Control Inputs b | Degree of Rotation About W Axis | (U',V') |
|---|---|---|---|
| 0 | 0 | +0  0 | (u,v) |
| 0 | 1 | +90 (−270) | (v,−u) |
| 1 | 0 | +180 (−180) | (−u,−v) |
| 1 | 1 | +270 (−90) | (−v,u) |

As a result of the information contained in Table 1, a mapping function can be employed to access voxel data stored in any memory storage unit as a function of the cumulative rotation about the W axis. FIG. 6 shows a circuit which may be utilized to execute the mapping identified in Table 1.

FIG. 6 shows circuit 100 for providing a virtual flip of the data coordinate system and corresponding effective reorientation of voxel data about the W axis of the cubic memory coordinate system. The circuit of FIG. 6 includes four inputs. First and second inputs ports 110, 120 respectively provide the u and v coordinates of a corresponding memory storage unit while third and fourth input ports 130, 140 respectively provide control signals a and b to identify the appropriate rotation about the W axis (i.e., 0°, 90°, 180°, 270°). The virtual flipping circuit 100 of FIG. 6 includes a plurality of inverters 150, a plurality of triple input AND gates 160a–h and quad input OR gates 70 and 170b to provide the (u', v') outputs.

Specifically, in the preferred embodiment, the virtual flipping circuit 100 includes eight triple input AND gates 160a–h, wherein each of the eight AND gates are electrically coupled to at least three of the four input ports 110, 120, 130, 140. Also included and coupled between the input ports and a portion of the AND gates are inverters 150 for providing respective inverted signals from the corresponding input ports to a respective input port of corresponding AND gate 160. The first AND gate 160a is provided input signal u from input port 110, and an inverted form of signals a and b from input ports 130 and 140 respectively. The second AND gate 160b is provided input signals b from input port 140, and an inverted form of signals a and v from input ports 130 and 120 respectively. The third AND gate 160c is provided input signal a from input port 130 and an inverted form of signals b and u from input ports 140 and 110 respectively. The fourth AND gate 160d is provided input signals b and a from input ports 130 and 140 respectively, and an inverted form of signal u from input port 110. The output of each of the first, second, third and fourth AND gates 160a, 160b, 160c and 160d are provided to a first four input OR gate 170a. The output signal provided by the first OR gate corresponds to the new u coordinate of the address of the memory storage unit (u,v) containing voxel data after a corresponding rotation around the W axis.

The fifth, sixth, seventh and eighth triple input AND gates 160e, 160f, 160g and 160h are utilized to generate the v' coordinate. The fifth AND gate 160e is provided input signals v and b from input ports 120 and 130 respectively, and an inverted form of input signal a from input port 130. The sixth AND gate 160f is provided input signals u and b from input ports 110 and 140 respectively, and an inverted form of input signal a from input port 130. The seventh AND gate 160g is provided input signal a from input port 130, and an inverted form of signals b and v, from input ports 140 and 120 respectively. The eighth AND gate 160h is provided input signals b and a from input port 130 and 140 respectively, and an inverted form of input signal u from input port 10. The output of each of the fifth through eighth AND gates is provided to a second quad input OR gate 170b. The output signal of the second quad input OR gate 170b provides the new v' coordinate of the address of the memory storage unit (u,v) containing voxel data after a corresponding rotation about the W axis.

In addition to the virtual flipping circuit 100 identified above, the reorientation unit 40 may also include a flip buffer 180, as shown in FIGS. 1 and 2A, for performing a physical rotation of the voxel data and the corresponding data coordinate system about the U and V axis of the cubic memory coordinate system. In the preferred embodiment of the present invention, the flip buffer is a two dimensional array of $N^2$ memory storage units 30. Preferably, the flip buffer 180 is implemented by adding a 1×N column of memory storage units 30 to end of each memory module 20. The fact that the flip buffer 180 is part of the modularized memory 10 is advantageous since N lines are not required to couple each memory module 20 to an auxiliary device. The flip buffer is coupled to each of the plurality of memory storage units which comprise the plurality of memory modules. The flip buffer supports two operations wherein each individual step is performed in parallel (i.e., simultaneously in each memory module). A first operation includes simultaneously copying each voxel data stored within a column of memory storage units of a first memory module, in parallel, to the columns of the flip buffer. The operation of copying columns is performed by reading the W-beam of voxel data at (u,v) and writing it as the $j^{th}$ column in the flip buffer. FIG. 3 shows two examples of a W-beam 52 wherein the U and V coordinates remain unchanged but the W coordinate of the ray changes. The operation of copying columns is performed from (u,0) to (u, N−1). The second operation involves simultaneously reading the voxel data in the flip buffer row by row, in parallel, and copying each voxel data back to the columns of the corresponding memory module. This operation is performed by reading the $j^{th}$ row of the flip buffer and writing it into the modularized memory as the W beam at (u,v) from (u,0) to (u, N−1). As a result of this operation, the flip buffer accomplishes a single 90° rotation about the U or V axis by writing all of the W beams of a U slice of the modularized memory into the columns of the flip buffer, and then copying the rows of the flip buffer back to the U slice of the cubic memory in the same manner from which the data was originally read from the modularized memory. FIG. 7 shows a computer implementation of the method of effective reorientation of voxel data stored in the modularized cubic memory utilizing the flip buffer for a +U rotation.

The actual implementation of the flip buffer can be achieved by a special purpose memory such as the Prism described in the publication "The Image Prism: A Device for Rotating and Mirroring Bitmap Images", IEEE Computer Graphics and Application, (May 1987). However, this special purpose device requires high linkage complexity wherein all memory modules have to be connected to the Prism. Therefore, in the preferred embodiment of the present invention, a skewed memory organization is utilized which better adapts to the flipping cube architecture and which requires only an additional component for trivial address mapping.

In an alternative embodiment of the present invention, as shown in FIGS. 8(a) and (b), if the voxel data stored in each memory module is reconfigured wherein the voxel data in the $j^{th}$ row of each memory module is rotationally shifted j places to the right, a skewed organization that supports parallel access to both rows and columns from one direction of access is created. Since only rows are laterally shifted, no voxel changes its row-position and corresponding row address which unit that rows can still be accessed in parallel. Since the voxel at (i, j) is shifted to ((i+j)mod N, j) we observe that the items in the $j^{th}$ column ( i.e. , (j,0) , (j,1), . . . , (j,M)), wherein M=N−1, are mapped to N different memory modules, (j+0) mod N, (j+1)mod N, . . . , (j+M )mod N. Therefore, parallel access to both rows and columns can be achieved by placing the voxel data stored at memory storage unit (i,j) of the flip buffer in the memory storage unit address ((i+j)mod N, j) of the corresponding memory module.

As previously mentioned, the implementation of reconfiguring the voxel data within the cubic memory utilizing the flip buffer is achieved in two steps. More specifically, a first step involves the operation of reading a W-beam of voxel data at (u,v) and writing it to the $i^{th}$ column in the flip buffer 180. This is accomplished in three stages. First, a W-beam of voxel data at (u,v) is placed in a shift mechanism coupled to each memory module by having memory module $W_k$ copy each voxel (u, v) of the W beam to its shift register. Next the W beam at (u,v) is shifted "i" steps to the right and copied into the corresponding memory module by having the $W_k$ memory module copy the content of its shift register into corresponding memory module address (N, (k−i)mod N). In a similar manner the implementation of reading the $j^{th}$ row of the flip buffer and writing it to the cubic memory as the W-beam at (u,v) involves three stages. First, the voxel data at memory module (N, j) is placed by the $W_k$ memory module in its corresponding shift register. Next, the shift mechanism rotates the provided voxel data j steps to the left. Finally, the $W_k$ memory module copies the content of its shift register into memory module (u,v).

In view of the above, each of the memory modules contains (N+1)×N memory storage units and supports four memory operations: voxel read from the modularized memory, voxel write to the modularized memory, row read from the flip buffer, and column write to the flip buffer. The voxel read and voxel write operations are performed on the first N columns of memory of each memory module while the row read and column write operations are performed on only the $(N+1)^{th}$ column of the cubic memory (i.e., the flip buffer). These operations can be implemented by a simple mapping of the memory storage unit address (u,v) into an internal address (u', v') of the corresponding memory storage unit computed by:

|  |  |
|---|---|
| (u,v) | voxel read |
| (u',v') = (u,v) | voxel write |
| (N,v) | row read |
| (N, (k-1 mod N)) | column write |

Figure 9A:
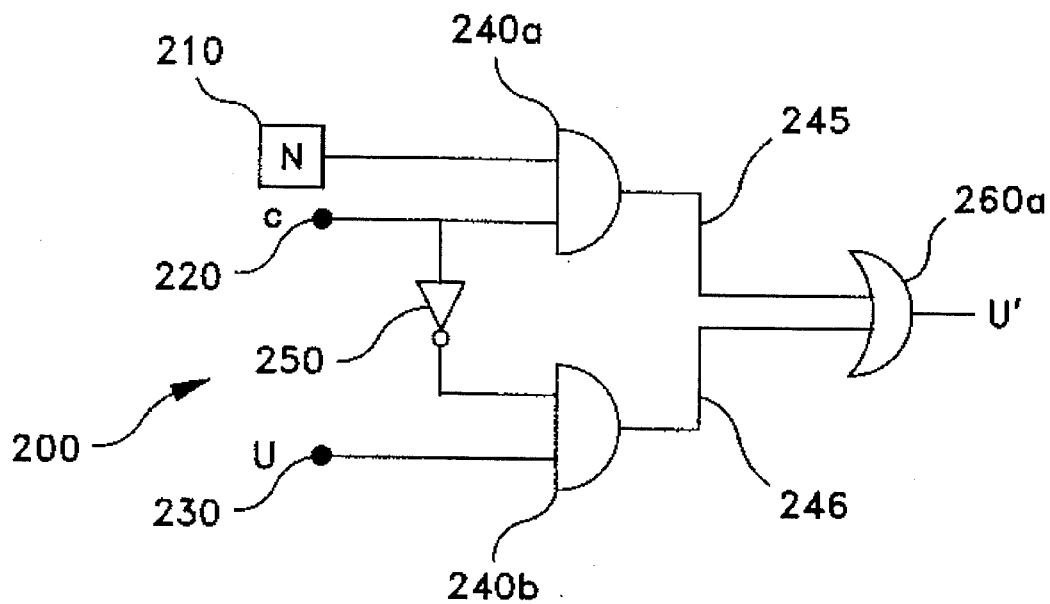
FIG. 9A is a block diagram of a readdressing circuit of the present invention for a first coordinate value.
Figure 9B:
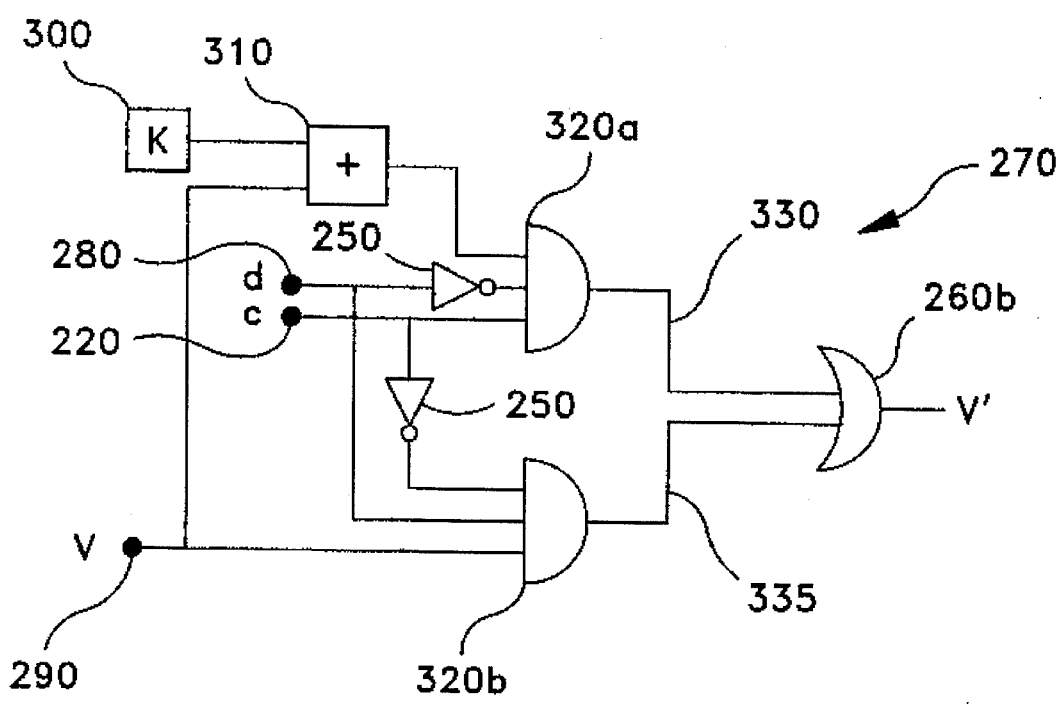
FIG. 9B is a block diagram of a readdressing circuit of the present invention for a second coordinate value.

FIGS. 9a and 9b show preferred circuits for implementing the addressing scheme describe above. The control bits c,d determine the action to be taken by the memory addressing unit according to Table 2. The input control d is the read write control line found in any standard memory unit while the input control c determines if the current operation should be directed to the flip buffer portion $((N+1)^{th}$ column) of $W^k$ memory module or to one of the first N columns of the memory module.

TABLE 2

| Operation | c | d |
|---|---|---|
| voxel read | 0 | 0 |
| voxel write | 0 | 1 |
| row read | 1 | 0 |
| column write | 1 | 1 |

Referring now to FIGS. 9A and 9B, preferred circuit designs are shown for an addressing unit for a flip buffer coupled to each memory module. FIG. 9A shows a first circuit 200 for determining the new address u' of a voxel data stored in memory storage unit 30 at coordinate (u,v) in module $W_k$. The first addressing circuit 200 includes three input ports 210, 220, 230 including an input port for control signal c 220, an input port 230 for the U address coordinate of the current voxel data, and an input port for the dimension N of the modularized memory. The circuit also includes two double input AND gates 240a, 240b. The first AND gate 240a is provided input signal N on one input port and control signal c on a second input port. Coupled between the control signal c input port 220 and a first input of the second AND gate 240b is an inverter 250 which provides an inverted control signal c to one input port of the second AND gate 240b. The second AND gate 240b is also provided the u coordinate of the current voxel data. The output of each of the first and second AND gates 240a, 240b is provided on lines 245 and 246 respectively to a double input OR gate 260a wherein the output of the OR gate 260a provides the new u coordinate, u'.

FIG. 9B shows the second addressing circuit 270 for implementation with the flip buffer for the v' address coordinate of voxel data. The second addressing circuit 270 includes four input ports including input port 220 for control signal c and input port 280 for control signal d, an input port 290 for the v coordinate of the current voxel data and an input port 300 for providing the number (k) of the current memory module. The k input signal is provided to a dual input port adder circuit 310 along with the v coordinate value of the current voxel data address from input port 290. The second addressing circuit also includes triple input AND gates 320a, 320b. The output signal of the adder circuit 310 is coupled to one input port of the first AND gate 320a. The first AND gate 320a is also provided control signal c from input port 220 and an inverted form of control signal d from input port 280. The inverted control bit signal d is generated by coupling an invertor 250 between input port 280 and the corresponding input port of the first AND gate 320a which receives the inverted d signal. The second triple input AND gate 320b of the second addressing circuit 270 is provided the current voxel data coordinate v as one input, the d control signal as the second input and an inverted form of control bit signal c as the third input. The inverted form of control bit signal c is generated by providing an inverter 250 between the control bit signal c input port 220 and the corresponding input port of the second triple input AND gate 320b. Each of the first and second AND gates 320a, 320b provide an output signal on lines 330, and 335 respectively. The output signals of the first and second AND gates are provided to a double input OR gate 260b which provides an output signal indicative of the new v address coordinate, v', for the voxel data.

In an alternative form of the present invention, instead of utilizing a flip buffer and corresponding first and second addressing circuits to provide U and V rotations of the voxel data, a circuit is included which implements 3D shearing for providing a manipulation of the voxel data within the memory storage units of the cubic memory so as to effectuate rotational shifts of the voxel data about the U and V axes of the cubic memory coordinate system.

Figure 10C:
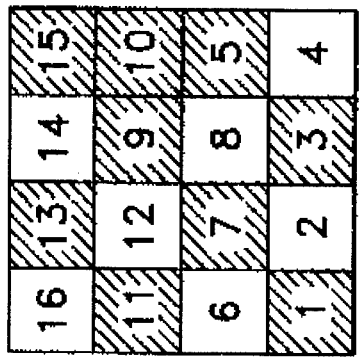
FIG. 10C is the shifted memory module of FIG. 10B wherein the memory storage units are wrapped around to be in 4×4 form.
Figure 10B:
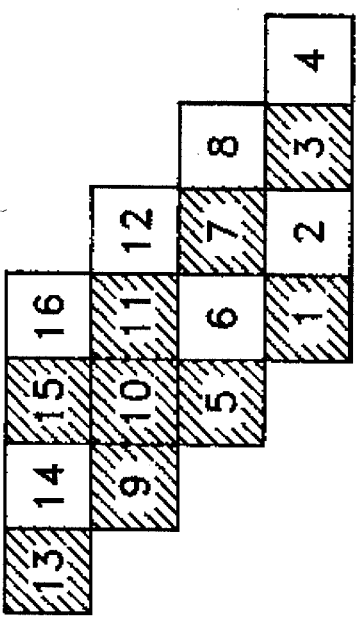
FIG. 10B is the 4×4 memory module of FIG. 10A after a first step of shearing.
Figure 10A:
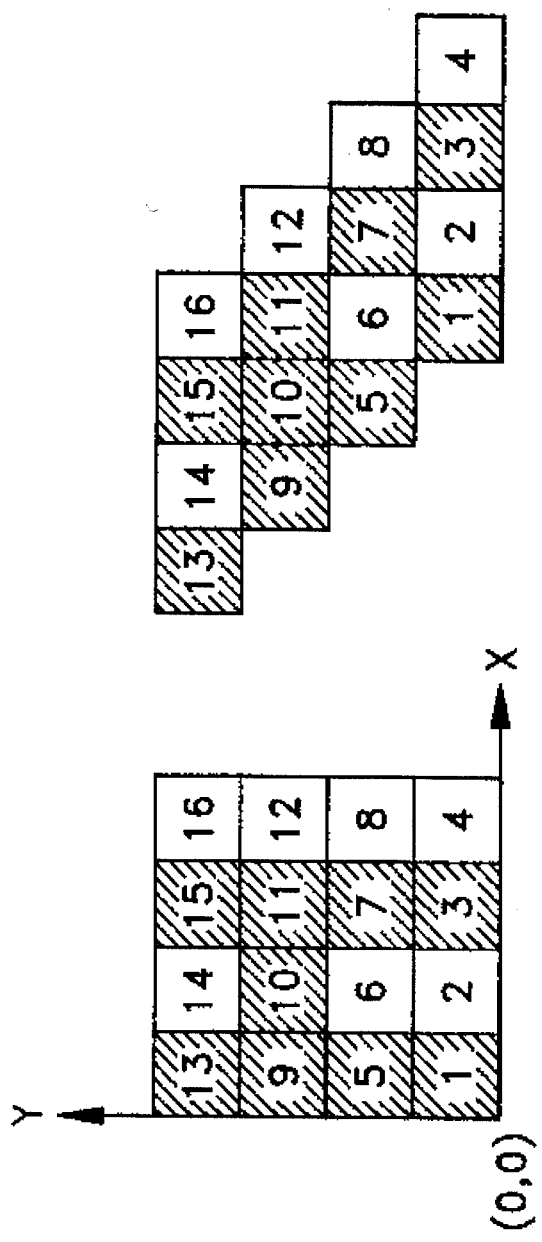
FIG. 10A is a 4×4 memory module having voxel data stored in each memory storage unit.

Referring now to FIGS. 10A–10G, the method of 3D shearing for a 90° rotation about the U and V axes is described, for simplicity, for a single N×N memory module which can then be expanded to a 3 dimensional memory. An apparatus for implementing the following method will be described later with regard to FIG. 12. FIG. 10A shows a 4×4 memory module wherein each memory storage unit is individually numbered from 1–16. The first step of the method includes horizontally shifting each row y places to the left wherein y is equivalent to the coordinate of the row being shifted as shown in FIG. 10B. The horizontal left shift is performed for each row, starting from the bottom row (y=0) to the top row (y=3). The left shift includes, when required by a left shift, providing the values from the first column of the memory module to the last column of the memory module as shown in FIG. 10C. As a result of the first shearing step, the value of the memory storage unit originally at coordinate (x,y) is now at [(x−y)mod N,y].

The second step of the shearing method includes vertically shifting the voxel data of the memory storage units of each column, x places upward wherein x is equivalent to the coordinate of the column being shifted as shown in FIG. 10D. The upward vertical shift is performed for each column starting with the first column, x=0, to the left most column, x=3. Similar to that explained with regard to the first step of the method, the upward shift includes providing the values of a column from the top row (y=3) to the bottom row (y=0), if necessary as shown in FIG. 10E. As a result of the second shearing step, the value that was at coordinate (x,y) after the first step is now located at (x, (x+y) mod N). However, by substituting the value of x determined after the first shearing step, it is evident that the value of original coordinate (x,y) is now located at ((x−y)mod N,x).

Figures 10F, 10G:
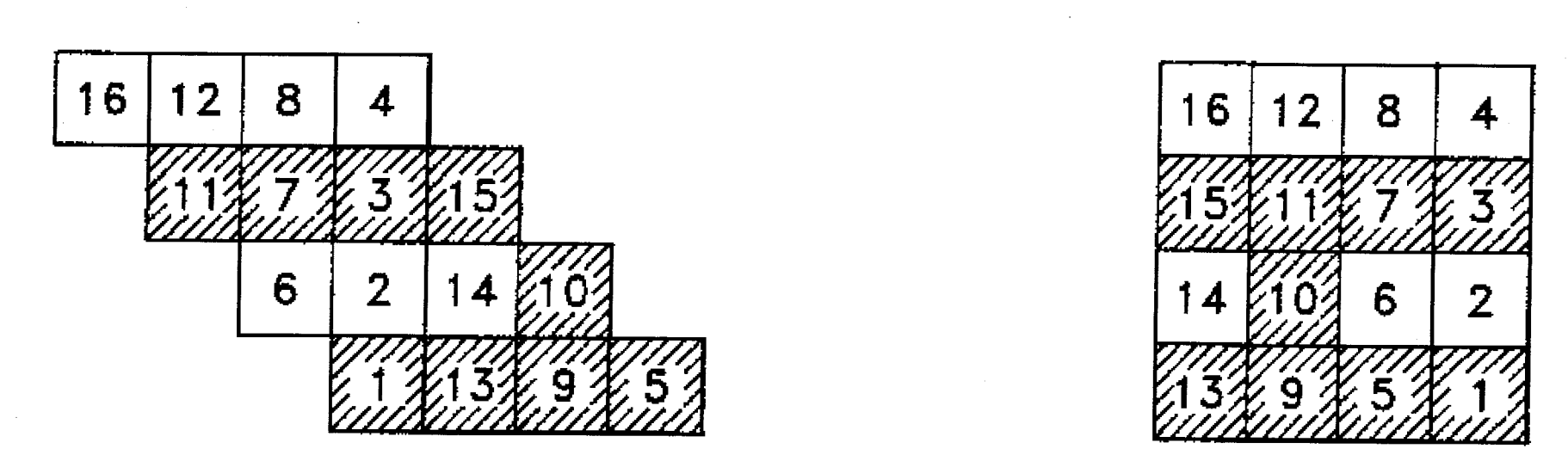

The third and final step of the shearing method includes providing a horizontal right shift of each row, starting from the top row (y=3) to the bottom row (y=0), wherein each row having coordinate y is shifted y places to the right as shown in FIG. 10F. The 90° rotation of the original memory module is provided after placing the voxel data that was shifted to the right beyond column x=3 to the columns x=0, x=1 and x=2 respectively. The value that was at coordinate (x,y) after the second step of the method is now located at ((x+m-y) Mod N,x] where M=N−1. However, by substituting the value for x and y from the result of the second step, the value that was originally at coordinate (x,y) is now located at (−y,x).

Altogether there are 512 possible sequences of three shearing operations for 90° rotation of the data, where each step of the method can be either upward, downward, rightward, or leftward shift. Each of the steps can traverse the rows (columns) starting from the $N^{th}$ row (column) toward the first row (column), or from the first row (column) to the $N^{th}$. Carefully examining all these sequences, there are only eight meaningful ones, four of which achieve a −90° flip while the other four perform a +90° flip. If U, D, R, L denote the direction of the shear, that is, upward, downward, rightward, or leftward, respectively, and the scan order is denoted by the subscript $X_{0-N}$ or $X_{n-0}$, the available shearing sequences can be summarized as follows:

---

−90° Transposition $R_{N-0}$, $U_{N-0}$, $L_{0-N}$
$L_{0-N}$, $D_{0-N}$, $R_{N-0}$
$D_{0-N}$, $R_{N-0}$, $U_{N-0}$
$U_{N-0}$, $L_{0-N}$, $D_{0-N}$ +90° Transposition $U_{0-N}$, $R_{0-N}$, $D_{N-0}$
$L_{N-0}$, $U_{0-N}$, $R_{0-N}$
$R_{0-N}$, $D_{N-0}$, $L_{N-0}$
$D_{N-0}$, $L_{N-0}$, $U_{0-N}$

---

FIG. 11A shows a preferred embodiment of the method of positive rotation about the U axis by shearing utilizing a computer program. However, the method may also be implemented utilizing known electrical components which transfer electronic signals.

The method shown in FIG. 11A may not be efficiently implemented with the flipping cube since the flipping cube only supports parallel access to W-beams, while the second loop of FIG. 11A requires shifting V beams. However, the 3-D shearing method of FIG. 11A effectively requires all voxel data in a W memory module to be shifted W steps downward. In other words, all voxel data in the W memory module is shifted W rows downward, modulo N. This whole slice shift can be achieved by adding to each memory module, two registers which hold respective row and column U-offset and V-offset values, and an address translation circuit which computes the new address by adding the respective offsets to the input address, modulo N. Therefore, the new coordinate value (u', v') of original coordinate (u,v) is represented by:

$$(u',v')=(u+u \text{ offset}) \bmod N, (V+V \text{ offset}) \bmod N)$$

The method utilizing this variation for use with the flipping cube is shown in FIG. 11B.

Figure 12:
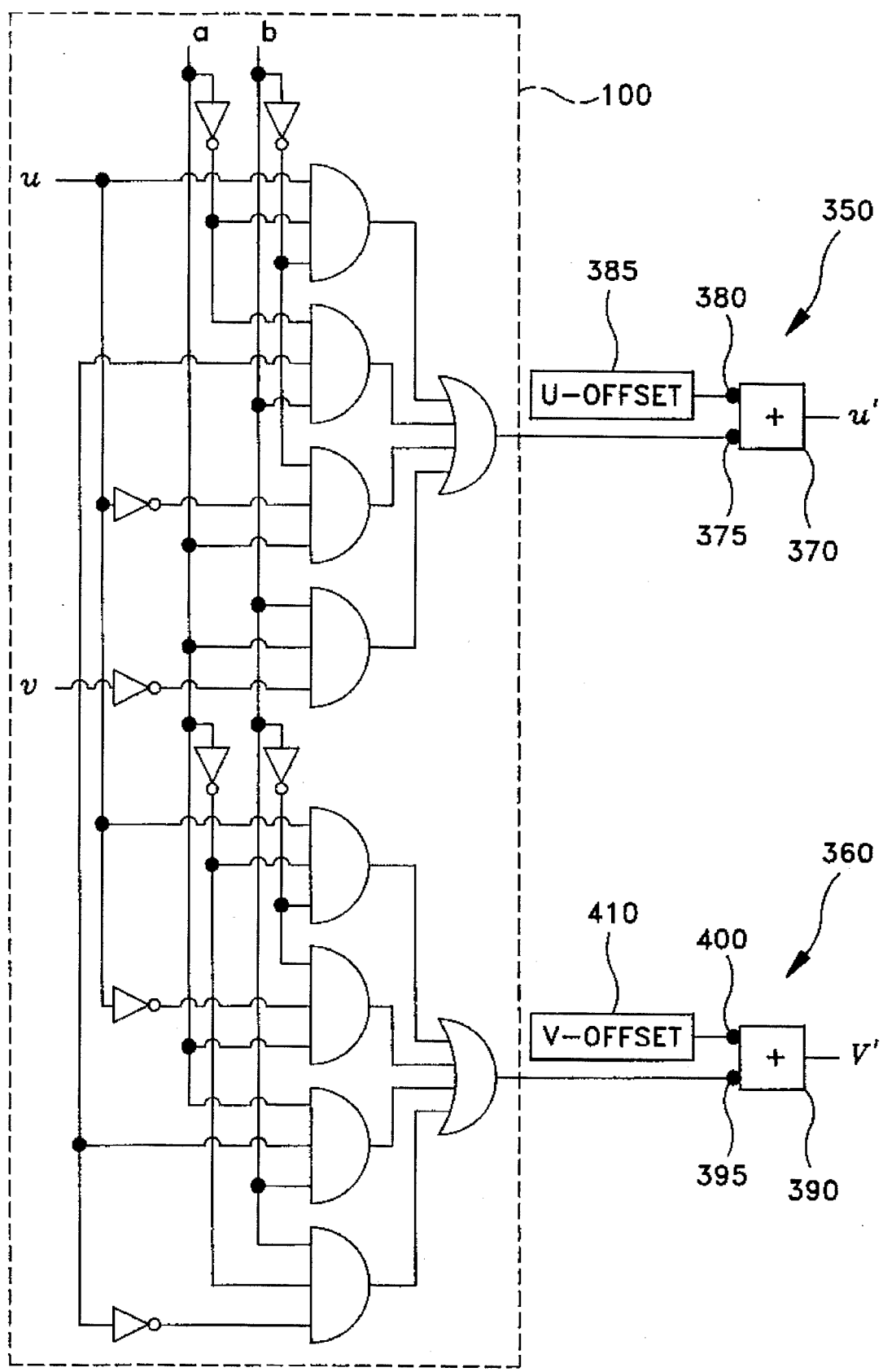
FIG. 12 is a block diagram of first and second offset circuits coupled to the virtual flipping circuit according to the present invention.

The apparatus for implementing the 3-D shearing, a U-coordinate 3-D shearing circuit 350 and a V-coordinate 3-D shearing circuit 360, are shown in FIG. 12 coupled to the ±W virtual flipping circuit 100 of FIG. 6. The U-coordinate 3-D shearing circuit 350, which provides the new U coordinate value after virtual rotation within the modularized memory, includes a first dual input-port adder circuit 370 wherein a first input port 375 is provided the output of the first OR gate 170a of the ±W virtual flipping circuit 100 and second input port 380 of the adder circuit is provided a signal generated by a U-offset circuit 385. The U-offset circuit output signal represents the current U-offset for a row of voxel data in a memory module. The first adder circuit 370 combines the U-offset signal value with the output signal of the first OR gate to provide a U coordinate value corresponding to the location of the voxel data after the respective rotation.

FIG. 12 also shows the V-coordinate 3-D shearing circuit 360 for providing the new V coordinate. The V coordinate 3-D shearing circuit 360 has a similar configuration to that of the U-coordinate 3-D shearing circuit. The V-coordinate 3-D shearing circuit includes a second dual input port adder circuit 390 having a first input port coupled to the output of the second OR gate of the ±W virtual flipping circuit 100 and a second input port 400 coupled to a V-offset circuit 410 which provides a V-offset signal to the second adder circuit. The second adder circuit combines the second OR gate output signal with the V-offset signal to provide a V coordinate value corresponding to the location of the voxel data after a respective rotation.

Figure 13:
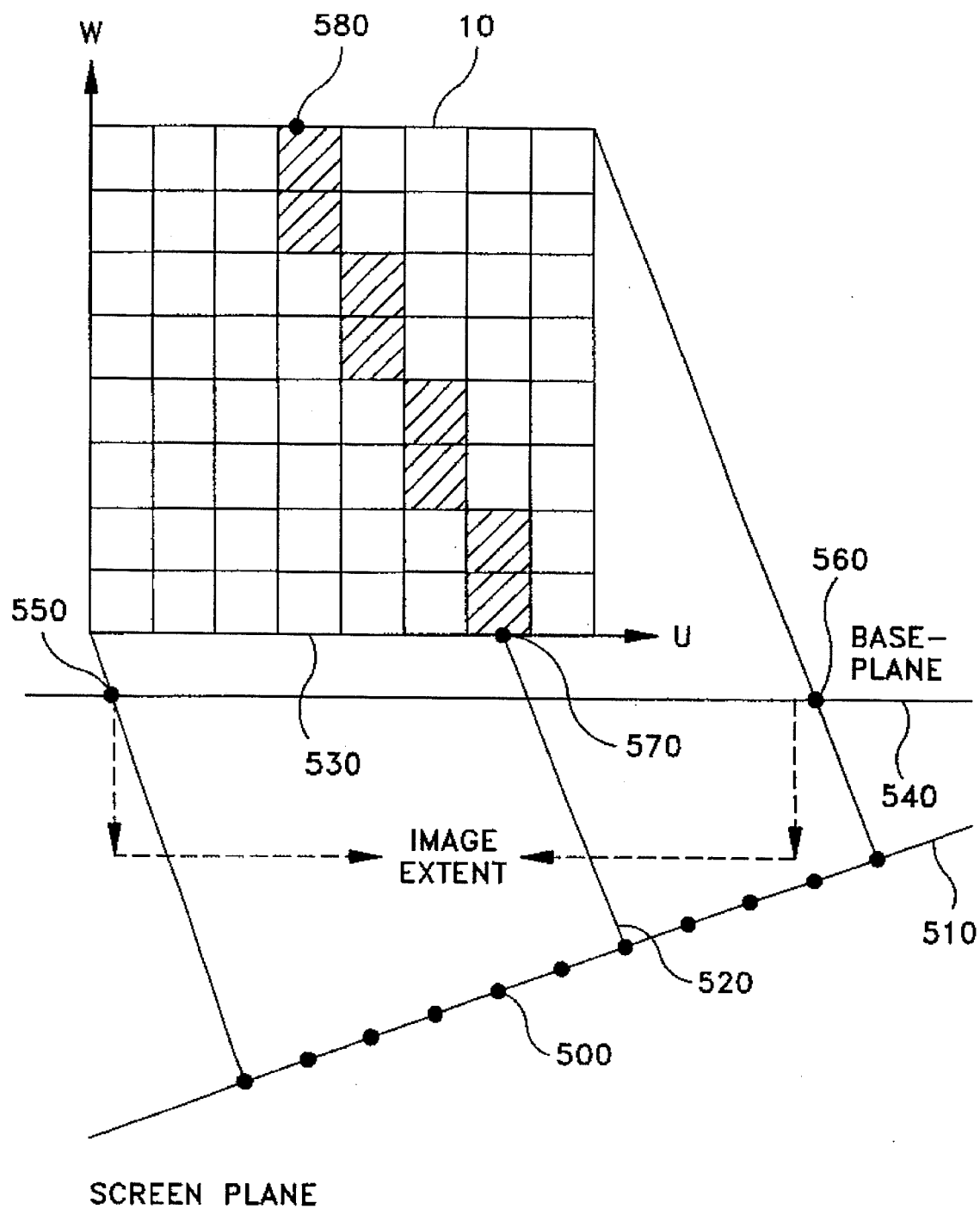
FIG. 13 is a representation of the method of real time volume rendering from an arbitrary viewing direction in accordance with the present invention.

The method of rendering an object from an arbitrary viewing direction will be described by reference to FIG. 13. FIG. 13 is a 2-D top plan view of the modularized memory having viewing rays traversing there through looking along the V-axis. The method generally includes, for each pixel 500 of the screen plane 510 which is to display the object, sending a discrete ray 520 into the modularized memory 10 while accumulating colors, opacities and characteristics of the voxel data representing the object. Preferably, the discrete ray is no longer traversed through the modularized memory when the accumulated color and opacity of the ray cannot significantly change its value (i.e., when the discrete ray accumulates an opaque color or when the discrete ray traverses through the entire representation of the object in the modularized memory).

Specifically, the method of the present invention includes selecting a desired viewing direction from which the voxel data stored in the cubic memory will be observed. The direction of viewing may be from any viewpoint as if an observer could select a particular perspective while walking around, above and below the object. Thereafter, the voxel data is rotated and reorganized by the flipping cube, if required and as previously described, so that the direction of viewing of the object and the voxel data (and the corresponding axis of the data coordinate system) is substantially parallel to the W-axis of the modularized memory. In this regard, substantially parallel requires that the major axis of the viewing direction, or axis which has the greatest change in voxel coordinate values along the viewing direction, is substantially parallel to the W-axis.

Thereafter, a screen plane 510 which is substantially perpendicular to the desired viewing direction is selected. The screen plane is selected so that the viewing rays 520, determined by the desired viewing direction, will traverse the modularized memory so that they are perpendicular to the screen plane. The screen plane represents the plane upon which the 3-D object is to be projected, and includes a plurality of pixels 500 on a display screen. The object representation stored in the modularized memory as voxel data will be projected on the screen plane 510 along the selected viewing direction. The method further includes determining a primary side 530 of the modularized memory. The primary side of the modularized memory corresponds to that portion of the memory that has the greatest projection on the screen plane along the desired viewing direction.

The method further includes determining a base plane 540 which is parallel to the primary side 530 of the modularized memory 10 as shown in FIG. 13. Unless orthographic projection is performed, the base plane will be different from the screen-plane. Preferably for efficiency purposes, the base plane 540 should coincide with the primary side 530 of the modularized memory. Thereafter, an outline of the representation of the object that is stored in the cubic memory is projected on the base plane 540 along the desired viewing direction. From the outline of the representation of the object (i.e., silhouette) stored in the memory on the base plane 540, a base plane image extent is determined as shown in FIG. 13. The base plane image extent is utilized to determine a beginning point and an end point of image projection on the screen plane along the viewing direction. The beginning point and end point of image projection can be represented, as shown in FIG. 13, by minimum 550 and maximum 560 values of the image extent. The minimum and maximum values indicate the boundaries of the ray projection.

The method further includes determining a ray template which corresponds to the stepping increments of parallel rays along the desired viewing direction from each pixel 500 into the modularized memory 10. One way to define the ray template is in a table containing the U,V, and W coordinate increments or steps of the projection ray. Therefore, if after traversing n steps according to the ray template, the head of the ray is located at coordinate (u,v,w), the next voxel to be visited is at coordinate (u',v' ,w') completed by:

ray template=(U increment, V increment, W increment).

wherein (u'v'w')=(u,v,w)+ray template.

As shown by the above, the ray template or stepping increments define the traversal of each of a plurality of projection rays through the cubic memory from a corresponding display pixel of the screen plane so as to access voxel attribute data from the memory storage units along the desired viewing direction.

The method further includes traversing a plurality of projection rays 520 according to the ray template through the modularized memory 10 starting from the base plane 540, corresponding to each pixel 500 of the plurality of pixels of the screen plane 510, within the minimum 550 and maximum 560 boundaries of the base plane object image extent. Preferably a 3-D volume ray template entrance point 570 and exit point 580 is determined for each projection ray traversed from the plurality of pixels of the screen-plane. In this manner, the projection ray is only traversed within the modularized memory because voxel data cannot exist outside the modularized memory. This results in faster access and projection of the voxel data since the projection ray need not be computed in areas wherein voxel attribute data is not located. Each projection ray that is traversed through the modularized memory accesses voxel attribute data in the plurality of memory storage units. As the projection ray traverses through the modularized memory and accesses voxel data, the projection ray effectively combines the voxel attribute data accessed from encountered memory storage units to provide a display value, corresponding to a pixel color, for representing that specific portion of the object along that particular projection ray. The display values are thereafter mapped from the base plane onto the screen plane by a two dimensional incremental transformation. A computer program for implementing the method of the invention including initialization and ray casting are shown in FIGS. 14A and 14B.

In the preferred embodiment of the method of rendering an object from an arbitrary viewing direction, 26-connected rays are utilized to generate the template of the projection rays. This is done for specific reasons. First, 26 connected rays traverse less memory storage units to set from a first location to a second location. That is, a 26-connected line from (x, y, z) to (x+$\Delta$x, y+$\Delta$y, z+$\Delta$z) will consist of max ($\Delta$x, $\Delta$y, $\Delta$z) voxels while a 6-connected line consists of $\Delta$x+$\Delta$y+$\Delta$z voxels. Since, on average, a 6connected line consists of almost twice the number of voxels of a 26-connected line, the 6connected line is expected to take almost twice the time for projection that it takes a 26-connected line. Secondly, 26-connected rays are capable of uniformly sampling the modularized memory, that is, each and every voxel is visited exactly once.

In an alternative embodiment, the method of the present invention may be modified to include screen super-sampling wherein multiple projection rays are emitted from the same pixel, but from different sub-pixel addresses as shown in FIG. 15. Therefore, instead of having one type (i.e., template) of ray traversal, several templates can be utilized. For example, if a super-sampling rate of four rays per pixel is desired, for the pixel at coordinate (i,j), four projection rays will originate from i±1/4,j±1/4). Therefore, for all (i,j), the rays (i+1/4,j+1/4) have the same form and only four different templates are needed. FIGS. 15(a), (b), (c) and (d) depict four 2D memory modules with rays being emitted in different sub-pixel locations. It is clear that although a different ray origin yields a different ray template, all rays with the same relative displacement of the origin have the same form.

Figure 16:
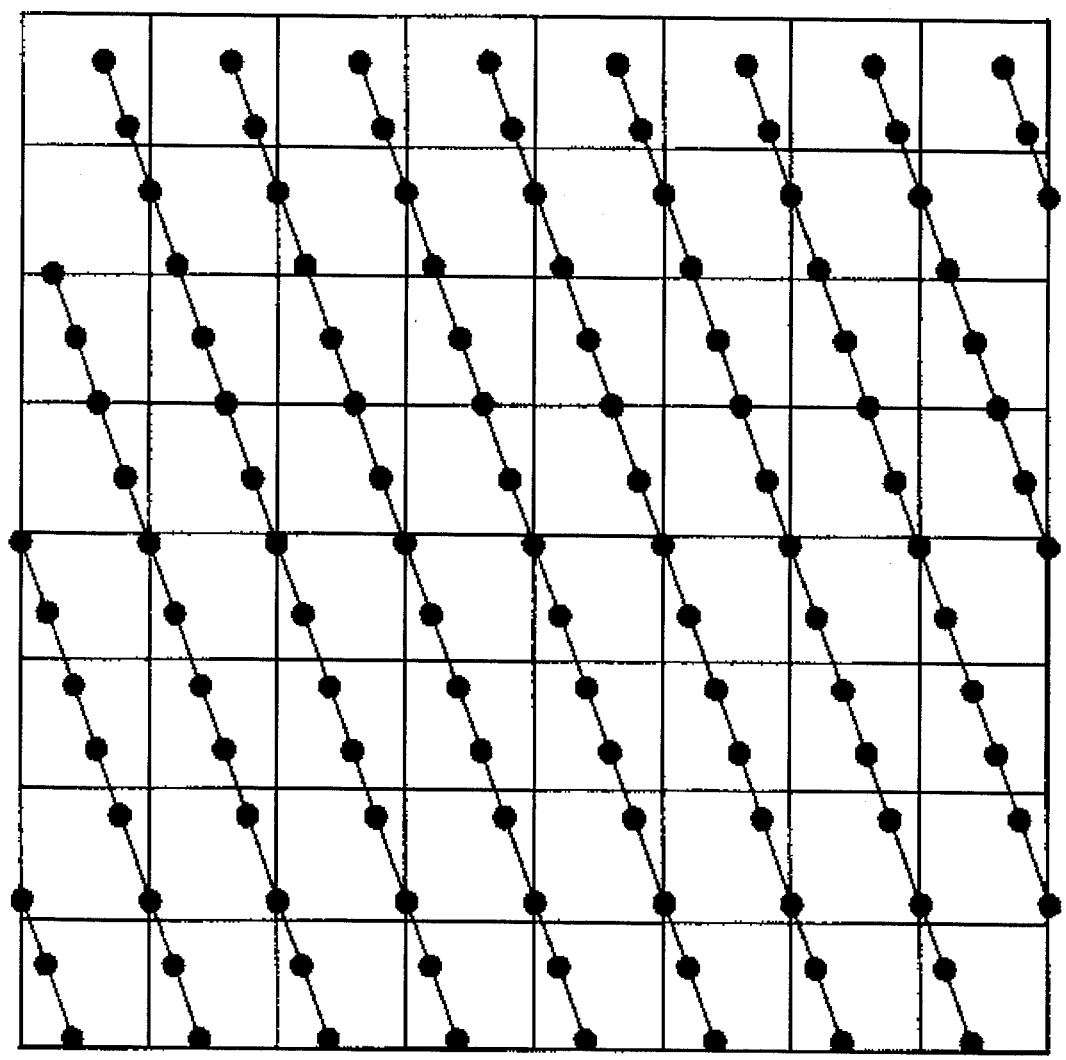
FIG. 16 is a representation of super-sampling along each ray which traverses the modularized memory.

In an alternative embodiment of the present invention, the super-sampling can also be extended along the projection ray to determine value variation across a voxel extent as shown in FIG. 16. Image quality can be enhanced if each voxel is sampled more than once. Preferably, trilinear value variation across a voxel extent is utilized to interpolate a voxel data value from the sampled voxel's eight neighbors. A preferred method of template-based trilinear interpolation is shown in FIG. 17.

In another embodiment of the present invention, the connectivity of the projection ray is adaptively switched from one sampling rate (26-connectivity) to another (6-connectivity). This is preferred because 26 connected rays might not encounter memory storage units they should traverse. However, 6-connected rays, while slower than 26-connected rays, guarantee traversal of every memory storage unit. In a preferred form of the invention, the method adaptively alternates between 26 and 6 connected rays by traversing the empty space of the modularized memory where no voxel data is stored with 26-connected rays, and switching to 6 connected rays only when the ray is in the vicinity of memory modules which contain voxel data. Preferably, this method is implemented by including a proximity flag to all the voxel data stored in the memory storage units bordering the voxel data to indicate the vicinity of voxel data of an object. Therefore, whenever a proximity flag is encountered, the 26 connected rays adaptively slow down and takes 6 -connected steps in order to avoid missing voxel data.

In a preferred embodiment of the present invention, the method of rendering an object from an arbitrary viewing direction is implemented utilizing the flipping cube architecture. Preferably a host computer or a special-purpose viewing processor coupled to the flipping cube by a bus provides each memory module ($W_o$–$W_k$) with U and V displacement values (displacement from the origin of the memory module slice) corresponding to the U and V coordinate values of the memory module for each ray. The host computer will also preferably provide the identification of the memory module $W_h$ where the viewing ray enters the modularized memory, and the identification of the memory module $W_N$ where the viewing ray exits the modularized memory. With this information provided to each memory module $W_k$, a pixel display value is computed for each viewing ray whereby, each memory module determines whether it is one of, or between, the entrance and exit memory modules for a first viewing ray (i.e., if the viewing ray traverses through that memory module). If so, by knowing the U,V coordinates of the viewing ray when it enters the modularized memory, the U and V displacements are combined with the original U,V entrance coordinates of the ray and the appropriate memory storage unit is accessed. This process is performed for each viewing ray wherein the voxel data for each viewing ray is accessed in parallel from the plurality of memory modules. FIG. 18A shows a preferred method of accessing voxel data performed by each memory module for each viewing ray.

Figure 18B:
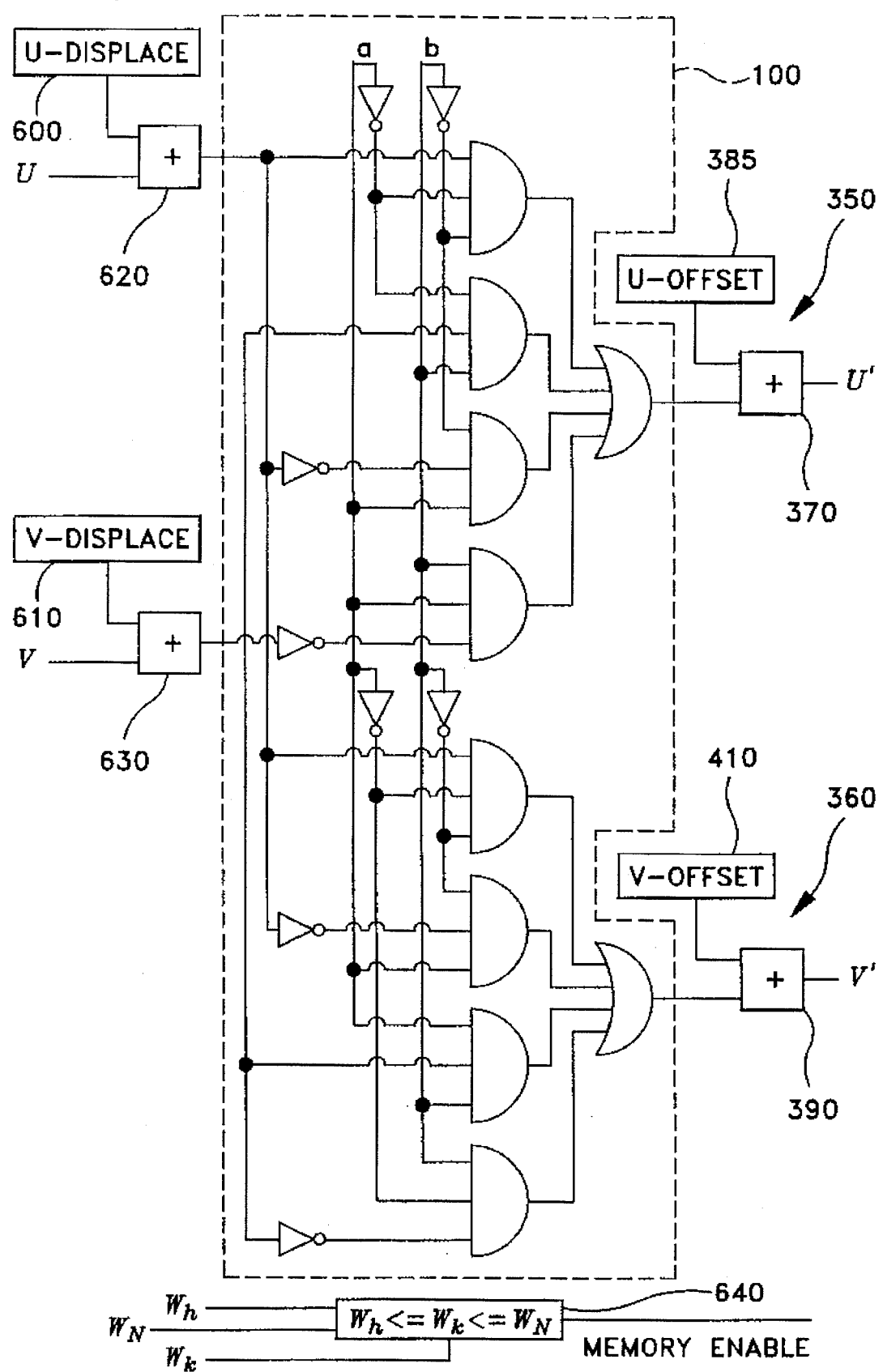
FIG. 18B is a block diagram of the apparatus for implementing the method of rendering an object from a desired viewing direction coupled to a virtual flipping circuit and a first and second offset circuit.

A preferred form of the apparatus for implementing the method of rendering an object from a desired viewing direction is shown in FIG. 18B which includes the virtual flipping circuit 100 and first and second offset circuits 350, 360 shown in FIG. 12. The circuit of FIG. 18B includes registers 600, 610 for providing respective U,V displacement values for each memory module. These respective U,V displacement registers 600, 610 are coupled to respective adder circuits 620, 630 along with U and V coordinate input signals. The output of the adders circuits correspond to respective U and V input coordinate signal values of the corresponding memory module for each viewing ray traversing the memory module.

The apparatus of FIG. 18B also includes a memory enable circuit 640 coupled to each memory module which is designed to enable a respective memory module if the current memory module ($W_k$) is one of or between the first ($W_h$) and last ($W_N$) memory module the viewing ray encounters as it transcends the modularized memory. If a memory module is outside the range of the entrance and exit points (range of memory modules) of the viewing ray, then that memory module is not activated by memory enable circuit 640 and does not add to the characteristics of that viewing ray as it is shown on a display device.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. Apparatus for providing 3-D volume projection of an object from a desired viewing direction, the desired viewing direction defining a plurality of projection rays, the apparatus comprising:
   (a) modularized memory having a plurality of memory modules, each of the plurality of memory modules having a plurality of memory storage units having memory address locations, each of the plurality of memory storage units being capable of storing voxel data therein, the voxel data substantially corresponding to attributes and characteristics of the object to be displayed;
   (b) reorientation means operatively coupled to each of the plurality of memory modules, the reorientation means being responsive to voxel data from at least first and second memory storage units of the plurality of memory modules, the reorientation means simultaneously outputting voxel data previously stored in the first memory storage unit to the second memory storage unit according to the desired viewing direction;
   (c) fetching means operatively coupled to each of the plurality of memory modules, the fetching unit simultaneously retrieving voxel data from the plurality of memory modules according to each of the plurality of projection rays; and
   (d) projection unit means coupled to the fetching means, the projection means being responsive to the voxel data retrieved from the plurality of memory modules according to each of the plurality of projection rays, the voxel data retrieved by each projection ray including a plurality of voxel attributes indicative of the characteristics of the object according to the desired viewing direction, the projection unit generating a projection value corresponding to the cumulation of voxel attributes for each of the plurality of projection rays, the projection value being indicative of the opaqueness and color of the aggregate of voxel attributes for each projection ray taken along the desired viewing direction.

2. Apparatus for providing 3-D volume projection of an object from a desired viewing direction as defined by claim 1 further comprising display means coupled to the projection means, the display means receiving the projection values for each of the plurality of projection rays and displaying the corresponding opaqueness and color with the display means.

3. Apparatus for providing 3-D volume projection of an object from a desired viewing direction as defined by claim 1 wherein the first memory storage unit is located in a first memory module and the second memory storage unit is located in a second memory module.

4. Apparatus for providing 3-D volume projection of an object from a desired viewing direction as defined by claim 1 wherein both the first and second memory storage units are located in substantially the same memory module.

5. Apparatus for providing 3-D volume projection from a desired viewing direction as defined by claim 1 wherein the plurality of memory storage units form a cubic memory capable of storing $N^3$ voxel data where N is one orthogonal dimension of the cubic memory, the cubic memory having N memory modules wherein each memory module is capable of storing $N^2$ voxel data within $N^2$ memory storage units.

6. Apparatus for providing 3-D volume projection of an object from a desired viewing direction as defined by claim 1 wherein the modularized memory is defined by a memory coordinate system having a first set of three orthogonal axes defining the memory address locations of each of the plurality of memory storage units, the voxel data having voxel data addresses defined by a data coordinate system having a second set of three orthogonal axes, and wherein the voxel data addresses defined by the three orthogonal axes of the data coordinate system are independently manipulated with respect to the three-orthogonal axes of the memory coordinate system.

7. Apparatus for providing 3-D volume projection of an object from a desired viewing direction as defined by claim 6 wherein the reorientation means effectively rotates the axes of the data coordinate system about a first axis of the memory coordinate system by readdressing voxel data within the plurality of memory storage units, the reorientation means further includes a virtual flipping circuit which redefines the memory address locations of the memory storage units storing the voxel data, the virtual flipping circuit effectively rotating the voxel data within each of the plurality of memory modules about one axis of the first set of three orthogonal axes.

8. Apparatus for providing 3-D volume projection of an object from a desired viewing direction as defined by claim 7 wherein the virtual flipping circuit comprises:
   a first multiple signal input means having at least four input ports, a first input port receiving a first signal indicative of a first memory address location coordinate of one of the memory storage units, a second input port receiving a second signal indicative of a second memory address location coordinate of the memory storage unit, third and fourth input ports respectively receiving third and fourth input signals indicative of first and second control signals;

a first coordinate transformation circuit including;

a first plurality of logic gates including a first multiple gate including first, second, third and fourth multiple input port AND elements, the first AND element having the third signal and inverted forms of the first and second signal applied to respective input ports, the first AND element providing a first AND element output signal, the second AND element having the second signal and inverted forms of the second and third signals applied to respective input ports, the second AND element providing a second AND element output signal, the third AND element having the third signal and inverted forms of the first and fourth signals applied to respective input ports, the third AND element providing a third AND element output signal, the fourth AND element having the third and fourth signals and an inverted form of the second signal applied to respective input ports, the fourth AND element providing a fourth AND element output signal, the first plurality of logic gates also including a first multiple input port OR element, each of the first, second, third and fourth AND element output signals being respectively provided to one of the four input ports of the first OR element, the first OR element having an output port for providing a first OR element output signal indicative of a transformed first memory address location coordinate value; and a second coordinate transformation circuit including;

a second plurality of logic gates including a second multiple gate including fifth, sixth, seventh and eighth multiple input port AND elements, the fifth AND element having the second signal and an inverted form of the third and fourth signals applied to respective input ports, the fifth AND element providing a fifth AND element output signal, the sixth AND element having the first and fourth signals and an inverted form of the third signal provided to respective input ports, the sixth AND element providing a sixth AND element output signal, the seventh AND element having the third input signal and inverted forms of the second and fourth input signals provided to respective input ports, the seventh AND element providing a seventh AND element output signal, the eighth AND element having the third and fourth input signals and an inverted form of the first input signal provided to respective input ports, the eighth AND element providing an eighth AND element output signal, the second plurality of logic gates also including a second multiple input port OR element, each of the fifth, sixth, seventh and eighth AND element output signals respectively being provided to one of the input ports of the second OR element, the second OR element having an output port for providing a second OR element output signal indicative of a transformed second memory address location coordinate value.

9. Apparatus for providing 3-D volume projection of an object from a desired viewing direction as defined by claim 7 wherein the reorientation unit further includes a readdressing circuit which effectively rotates the axes of the data coordinate system about second and third axis of the memory coordinate system by readdressing voxel data stored within the plurality of memory storage units of each memory module.

10. Apparatus for providing 3-D volume projection of an object from a desired viewing direction as defined by claim 9 wherein the readdressing circuit comprises:

a multiple signal input means having at least four input ports, a fifth input port receiving a fifth signal indicative of a dimension (N) of the cubic memory, a sixth input port receiving a sixth signal indicative of a third control signal, a seventh input port receiving a seventh signal indicative of the position of the memory module along the first axis of the memory coordinate system containing the memory storage unit which stores the voxel data to be readdressed, an eighth input port receiving an eighth signal indicative of a fourth control signal;

a third coordinate transformation circuit including:

a third plurality of logic gates including a multiple input gate including ninth and tenth multiple input AND elements, the ninth AND element having the fifth and sixth signals applied to respective input ports, the ninth AND element providing a ninth AND element output signal, the tenth AND element having the first signal and an inverted form of the sixth signal applied to respective input ports, the tenth AND element providing a tenth AND element output signal, the third plurality of logic gates including a third multiple input port OR element, each of the ninth and tenth output signals being provided to one of the input ports of the third OR element, the third OR element providing a third OR element output signal indicative of a transformed first memory address location coordinate value; and a fourth coordinate transformation circuit including:

a fourth plurality of logic gates including a multiple input gate including multiple input port eleventh and twelfth AND elements and a multiple input adder circuit, the adder circuit having the seventh and second signals respectively applied thereto, the adder circuit providing an adder circuit output signal, the eleventh AND element having the adder circuit output and sixth signal and an inverted form of the eighth signal applied respectively to one of the eleventh AND element input ports, the eleventh AND element providing an eleventh AND element output signal, the twelfth AND element having the second and eighth signals and an inverted form of the sixth signal respectively applied to one of the twelfth AND element input ports, the fourth plurality of logic gates including a fourth multiple input port OR element, the eleventh and twelfth AND element output signals being respectively applied to the input ports of the fourth OR element, the fourth OR element providing a fourth OR element output signal indicative of a transformed second memory address location coordinate value.

11. Apparatus for providing 3-D volume projection of an object from a desired viewing direction as defined by claim 7 wherein the reorientation means further includes first and second offset circuits, the first offset circuit being coupled to the output port of the first OR element, the first offset circuit providing an output signal indicative of a transformed first memory address location coordinate value, the second offset circuit being coupled to the output port of the second OR element, the second offset circuit providing an output signal indicative of a transformed second memory address location coordinate value.

12. Apparatus for providing 3-D volume projection of an object from a desired viewing direction as defined by claim 11 wherein the first offset circuit includes a first multiple input port adder circuit, the first adder circuit receiving the first OR element output signal at a first input port, the first offset circuit also including a first coordinate offset value circuit which provides a first offset output signal indicative of an offset value of the first coordinate offset value of the corresponding memory module of the respective voxel data, the first offset output signal being provided to a second input port of the first adder circuit, the first adder circuit providing a first adder circuit output signal indicative of a transformed first memory address location coordinate value; and the second offset circuit includes a second multiple input port adder circuit, the second adder circuit receiving the second OR element output signal at a first input port, the second offset circuit also including a second coordinate offset value circuit which provides a second offset output signal indicative of an offset value of the second coordinate offset value of the corresponding memory module of the respective voxel data, the second offset output signal being provided to a second input port of the second adder circuit, the second adder circuit providing a second adder circuit output signal indicative of a transformed second memory a coordinate transformation value.

13. A method for providing a 3-D volume projection image of an object from a desired viewing direction, characteristics of the object being stored as voxel attribute data in a cubic memory, the method comprising:

a) selecting a desired viewing direction and a corresponding screen-plane upon which to provide the 3-D volume projection image, the screen plane being represented by a plurality of display pixels, each display pixel defining a starting point for a projection ray;

b) determining a primary side of the cubic memory, the primary side of the cubic memory corresponding to the portion of the cubic memory that has the greatest projection on the screen plane along the desired viewing direction;

c) determining a base plane, the base plane being substantially parallel to the primary side of the cubic memory;

d) determining a ray template defined by a plurality of ray stepping increments, the ray template being determined according to the desired viewing direction, the plurality of ray stepping increments defining the traversal of each of the plurality of projection rays through the cubic memory from a corresponding display pixel of the screen plane for accessing voxel attribute data along the desired viewing direction;

e) traversing the plurality of projection rays through the cubic memory from each pixel of the plurality of pixels of the screen plane according to the ray stepping increments and a corresponding screen pixel, the traversal of each of the plurality of projection rays accessing a plurality of voxel attribute data stored in the plurality of memory storage units, each projection ray combining the voxel attribute data accessed from respective memory storage units to provide a pixel display value; and f) mapping the projected image and respective pixel display values from the base plane onto the screen-plane.

14. A method for providing a 3-D volume projection image of an object from a desired viewing direction as defined by claim 13, wherein before step (d), the method further comprises:

(i) projecting an outline of the characteristics of the object along the desired viewing direction on the base plane, the projection utilizing voxel attribute data stored in the memory storage units; and (ii) determining a base plane object image extent corresponding to the outline of the voxel attribute data on the base plane, the traversal of each of the plurality of projection rays occurring within the boundaries of the base line object image extent.

15. A method of providing a 3-D volume projection image of a 3-D volume from an arbitrary viewing direction as defined by claim 13 wherein step (e) further comprises:

(1) determining a cubic memory ray template entrance point and ray template exit point for each projection ray traversed from the plurality of pixels of the screen-plane, the cubic memory ray template entrance and exit points corresponding to respective boundaries of the cubic memory for each of the plurality of projection rays; and (2) determining which of the plurality of memory storage units is encountered by each projection ray template that is traversed, each encountered memory storage unit providing a voxel attribute data value representative of characteristics of the object to be displayed.

16. A method of providing a 3-D volume projection image of a 3-D volume from an arbitrary viewing direction as defined by claim 13 wherein the base-plane is distinct from the screen-plane.

17. A method for providing a 3-D volume projection image of an object from a desired viewing direction as defined by claim 13, the voxel attribute data having a voxel data coordinate system address corresponding to a voxel data coordinate system having first, second and third orthogonal axis, the desired viewing direction substantially corresponding to one of the first, second and third orthogonal axis of the voxel data coordinate system, wherein before the plurality of projection rays are traversed through the cubic memory which has first, second and third orthogonal axes, the method comprising:

(i) determining whether the ray stepping increments taken along the desired viewing direction are substantially parallel to one of the first and second orthogonal axis of the cubic memory, and (ii) reorienting the voxel attribute data of the voxel data coordinate system within the cubic memory so that the orthogonal axis of the voxel data coordinate system which substantially corresponds to the desired viewing direction is substantially parallel to the third orthogonal axis of the cubic memory.

18. A method of providing a 3-D volume projection image of a 3-D volume from an arbitrary viewing direction as defined by claim 17 wherein the reorientation of voxel data of the voxel data coordinate system includes effectively rotating the voxel data coordinate system about one of the first and second axis of the cubic memory.

19. A method of providing a 3-D volume projection image of a 3-D volume from an arbitrary viewing direction as defined by claim 13 wherein the base plane coincides with the primary side of the cubic memory.

* * * * *

UNITED STATES PATENT AND TRADEMARK OFFICE
CERTIFICATE OF CORRECTION

PATENT NO. : 5,544,283
DATED : August 6, 1996
INVENTOR(S) : Kaufman et al.

It is certified that error appears in the above-indentified patent and that said Letters Patent is hereby corrected as shown below:

| | |
|---|---|
| Column 3, Line 42, | now reads "unit", should read --means--; |
| Column 3, Line 39, | now reads "unit", should read --means--; |
| Column 3, Line 46, | now reads "unit", should read --means--; |
| Column 3, Line 48, | now reads "unit", should read --means--; |
| Column 3, Line 50, | now reads "unit", should read --means--; |
| Column 3, Line 51, | now reads "unit", (both occurrences) should read --means--; |
| Column 3, Line 52, | now reads "unit", should read --means--; |

UNITED STATES PATENT AND TRADEMARK OFFICE
CERTIFICATE OF CORRECTION

PATENT NO. : 5,544,283
DATED : August 6, 1996
INVENTOR(S) : Kaufman et al.

It is certified that error appears in the above-indentified patent and that said Letters Patent is hereby corrected as shown below:

| | |
|---|---|
| Column 3, Line 57, | now reads "unit", should read --means--; |
| Column 3, Line 62, | (both occurrences) should read --means--; |
| Column 3, Line 65, | now reads "unit", should read --means--; |
| Column 5, Line 14, | after "coordinate", "value; Fig 9B" should start a new paragraph. |
| Column 6, Line 27, | now reads "unit", should read --means--; |
| Column 6, Line 29, | now reads "unit", should read --means--; |
| Column 6, Line 30, | now reads "unit", should read --means--; |

UNITED STATES PATENT AND TRADEMARK OFFICE
CERTIFICATE OF CORRECTION

PATENT NO. : 5,544,283
DATED : August 6, 1996
INVENTOR(S) : Kaufman et al.

It is certified that error appears in the above-indentified patent and that said Letters Patent is hereby corrected as shown below:

| | |
|---|---|
| Column 7, Line 1, | now reads "storage unit", should read --storage unit 30--; |
| Column 8, Line 27, | now reads "unit", should read --means--; |
| Column 8, Line 28, | now reads "unit", should read --means--; |
| Column 8, Line 50, | now reads "unit", should read --means--; |
| Column 8, Line 51, | now reads "unit", (both occurrences) should read --means--; |
| Column 8, Line 57, | now reads "unit", should read --means--; |
| Column 9, Line 17, | now reads "unit", should read --means--; |

UNITED STATES PATENT AND TRADEMARK OFFICE
CERTIFICATE OF CORRECTION

PATENT NO. : 5,544,283
DATED : August 6, 1996
INVENTOR(S) : Kaufman et al.

It is certified that error appears in the above-indentified patent and that said Letters Patent is hereby corrected as shown below:

| | |
|---|---|
| Column 9, Line 18, | now reads "unit", should read --means--; |
| Column 9, Line 20, | now reads "unit", should read --means--; |
| Column 9, Line 25, | now reads "unit", should read --means--; |
| Column 10, Line 49, | now reads "70", should read --170--; |
| Column 11, Line 22, | now reads "input port 10", should read --input port 110--; |
| Column 11, Line 29, | now reads "unit", should read --means--; |
| Column 13, Line 10, | now reads "read write", should read --read/write--; |

IN THE CLAIMS:

| | |
|---|---|
| Column 20, Line 4, | now reads "unit", should read --means--; |
| Column 21, Line 62, | now reads "unit", should read --means--; |

UNITED STATES PATENT AND TRADEMARK OFFICE
CERTIFICATE OF CORRECTION

PATENT NO. : 5,544,283
DATED : August 6, 1996
INVENTOR(S) : Kaufman et al.

It is certified that error appears in the above-indentified patent and that said Letters Patent is hereby corrected as shown below:

Column 20, Line 4,      now reads "unit", should read --means--;

Column 21, Line 62,     now reads "unit", should read --means--;

Signed and Sealed this

Eighteenth Day of February, 1997

Attest:

BRUCE LEHMAN

*Attesting Officer*          *Commissioner of Patents and Trademarks*

UNITED STATES PATENT AND TRADEMARK OFFICE
CERTIFICATE OF CORRECTION

PATENT NO. : 5,544,283
DATED : August 6, 1996
INVENTOR(S) : Kaufman et al.

It is certified that error appears in the above-indentified patent and that said Letters Patent is hereby corrected as shown below:

<u>Column 1, Line 5,</u>  should read -- <u>Statement of Government Rights</u>

This invention was made with Government support under contract MIP-8805130 awarded by the National Science Foundation. The Government has certain rights in the invention. --

Signed and Sealed this

Eleventh Day of March, 1997

*Attest:*

BRUCE LEHMAN

*Attesting Officer*  Commissioner of Patents and Trademarks